US010681007B2

United States Patent
Talamo et al.

(10) Patent No.: US 10,681,007 B2
(45) Date of Patent: Jun. 9, 2020

(54) STRING SEARCH AND MATCHING FOR GATE FUNCTIONALITY

(71) Applicant: Konvax Corporation, Cambridge, MA (US)

(72) Inventors: Maurizio Talamo, Rome (IT); Franco Arcieri, Rome (IT); Christian H. Schunck, Rome (IT); Armanas Povilionis, Siauliai (LT)

(73) Assignee: Konvax Corporation, Cambridge, MA (US)

( * ) Notice: Subject to any disclaimer, the term of this patent is extended or adjusted under 35 U.S.C. 154(b) by 230 days.

(21) Appl. No.: 15/825,924

(22) Filed: Nov. 29, 2017

(65) Prior Publication Data

US 2018/0083921 A1 Mar. 22, 2018

Related U.S. Application Data

(63) Continuation-in-part of application No. PCT/US2016/035666, filed on Jun. 3, 2016.

(60) Provisional application No. 62/430,992, filed on Dec. 7, 2016, provisional application No. 62/171,544, filed on Jun. 5, 2015, provisional application No. 62/172,963, filed on Jun. 9, 2015, provisional application No. 62/257,291, filed on Nov. 19, 2015.

(51) Int. Cl.
| | |
|---|---|
| *H04L 29/06* | (2006.01) |
| *G06F 16/732* | (2019.01) |
| *H04L 29/08* | (2006.01) |
| *G06F 16/903* | (2019.01) |

(52) U.S. Cl.
CPC ...... *H04L 63/0245* (2013.01); *G06F 16/7343* (2019.01); *G06F 16/90344* (2019.01); *H04L 63/0263* (2013.01); *H04L 67/1036* (2013.01)

(58) Field of Classification Search
CPC .................................................... H04L 63/245
USPC ........................................................... 726/12
See application file for complete search history.

(56) References Cited

U.S. PATENT DOCUMENTS

| | | | |
|---|---|---|---|
| 7,548,992 B2 | 6/2009 | Oksanen | |
| 7,945,544 B2 * | 5/2011 | Farber ................... | G06F 16/164 |
| | | | 707/698 |
| 9,736,115 B2 * | 8/2017 | Davis, Jr. ............ | H04L 63/0227 |

(Continued)

OTHER PUBLICATIONS

International Search Report for PCT/US2016/035666.

*Primary Examiner* — Jacob Lipman
(74) *Attorney, Agent, or Firm* — Occhiuti & Rohlicek LLP

(57) ABSTRACT

Fast string search and matching is critical for many security tasks in particular if these have "gate functionality" for instance as found in access control applications, firewalls, routers, and load balancers. The fast matching of strings is essential to impose and enforce access control policies without creating bottlenecks. Firewalls protect networks by monitoring the traffic crossing the network perimeter. The number of packet matching rules firewalls can effectively handle is limited by the matching time and space complexity of the algorithms employed. A new approach implements matching independent of the number of rules and linear in the length of the rule to be matched. A data structure used in this approach is referred to as a "Bipartite Concatenated Representation" (BCR). The space complexity of the BCR within this application scenario scales as $O(N \log^2 N)$ where $N$ is the number of rules.

28 Claims, 9 Drawing Sheets

(56) References Cited

U.S. PATENT DOCUMENTS

| | | | |
|---|---|---|---|
| 2007/0130140 A1* | 6/2007 | Cytron | G06F 16/90344 |
| 2008/0228933 A1* | 9/2008 | Plamondon | H03M 7/30 709/230 |
| 2014/0282854 A1 | 9/2014 | Clark et al. | |
| 2015/0156183 A1 | 6/2015 | Beyer et al. | |

* cited by examiner

| 1 | 2 | 3 | 4 | 5 | 6 | 7 | 8 | 9 |
|---|---|---|---|---|---|---|---|---|
| 1 | 2 | 3 | 6 | 7 | 5 | 4 | 9 | 8 |

$G$:

| a | b | c | d | e | f | g | h | i | j | k |
|---|---|---|---|---|---|---|---|---|---|---|
| 2 | 1 | 1 | 5 | 1 | 3 | 4 | 3 | 6 | ∅ | 4 |

$M$:

|   | 1 | 2 | 3 | 4 | 5 | 6 |
|---|---|---|---|---|---|---|
| 1 |   | $a_1$ |   |   |   |   |
| 2 | $b_2$ |   |   | $g_{12}$ | $d_{15}$ |   |
| 3 | $c_3$ | $a_4$ |   | $k_{13}$ |   |   |
| 4 |   | $a_5$ | $f_{24}$ | $g_{23}$ |   | $i_{22}$ |
| 5 | $e_6$ |   | $f_{21}$ | $g_{11}$ |   |   |
| 6 | $b_7$ |   |   | $g_{10}$ |   |   |
| 7 | $e_8$ |   | $h_{17}$ | $g_{19}$ | $d_{20}$ | $i_{14}$ |
| 8 |   | $a_9$ | $h_{18}$ | $k_{18}$ |   |   |
| 9 |   |   | $h_{25}$ |   |   |   |

| 1 | 2 | 3 | 4 | 5 | 6 | 7 | 8 | 9 |
|---|---|---|---|---|---|---|---|---|
| 1,1 | 1,2 | 1,3 | 1,6 | 2,2 | 1,5 | 2,3 | 1,4 | 2,1 |

Cluster 1

$G_1$:

| a | b | c | d | e | f | g | h | i | j | k |
|---|---|---|---|---|---|---|---|---|---|---|
| 2 | 1 | 1 | 3 | 1 | 3 | 2 | 1 | ∅ | ∅ | 3 |

$M_1$:

|   | 1 | 2 | 3 |
|---|---|---|---|
| 1 |   | $a_1$ |   |
| 2 | $b_2$ | $g_{12}$ | $d_{15}$ |
| 3 | $c_3$ | $a_4$ | $k_{13}$ |
| 4 | $h_{25}$ |   |   |
| 5 | $e_8$ | $g_{11}$ | $f_{21}$ |
| 6 | $b_7$ | $g_{10}$ |   |

Cluster 2

$G_2$:

| a | b | c | d | e | f | g | h | i | j | k |
|---|---|---|---|---|---|---|---|---|---|---|
| 1 | ∅ | ∅ | 5 | 1 | 2 | 4 | 2 | 3 | ∅ | 3 |

$M_2$:

|   | 1 | 2 | 3 | 4 | 5 |
|---|---|---|---|---|---|
| 1 | $a_9$ | $h_{18}$ | $k_{18}$ |   |   |
| 2 | $e_6$ | $h_{17}$ | $i_{14}$ | $g_{19}$ | $d_{20}$ |
| 3 | $a_5$ | $f_{24}$ | $i_{22}$ | $g_{23}$ |   |

STRING SEARCH AND MATCHING FOR GATE FUNCTIONALITY

CROSS-REFERENCE TO RELATED APPLICATIONS

This application is a Continuation-In-Part of PCT Application No. PCT/US2016/035666, filed on Jun. 3, 2016, published as WO/2016/196892 on Dec. 8, 2016, which claims the benefit of U.S. Provisional Applications No. 62/171,544, filed Jun. 5, 2015, No. 62/172,963, filed Jun. 9, 2015, and No. 62/257,291, filed Nov. 19, 2015.

This applicational also claims the benefit of U.S. Provisional Application No. 62/430,992, filed Dec. 7, 2016.

The content of each of the above-referenced applications is incorporated herein by reference.

BACKGROUND

This invention relates to an approach to efficient and predictable-time string search and matching, and in particular is related to use of such an approach for gate functionality, such in a firewall device of a data network.

Fast string search and matching is critical for many security applications in particular if these have "gate functionality" like firewalls, access control applications and load balancers. In the description below, references to "firewalls" should be understood to be generally applicable to a wide range of gate functionality devices (also referred to below as a "gate device"), and not limited by the use of the word "firewall." Fast matching is essential to impose and enforce access policies without creating bottlenecks. Firewalls in particular protect networks by monitoring the traffic crossing the network perimeter. The number of packet matching rules a firewall can effectively handle is limited by the matching time and space complexity of the algorithms employed. In principle, the more specific the rules can be made the more fine-grained policies can be enforced to enhance security. In practice rules-bases of 10,000 rules are considered as large for firewalls. Through the use of wildcards and overlapping rules—to realize intersections and difference operations on sets of IP addresses or port numbers—network administrators therefore attempt to be acceptably specific while limiting the number of rules.

A firewall essentially acts as an access filter between the inside and the outside of almost any organization's networking systems. The filtering should be as specific as possible to maintain high level of security and to provide high bandwidth to avoid becoming a bottleneck and thus leading to unusable and unstable networking service. In many implementations, each data packet arriving at a firewall is inspected, and various fields are extracted and checked against a set of predefined patterns. For example, the source IP address of a packet may be compared to a list of known addresses, each of which may be associated with a particular security policy. The list of known values for a field for which policies are defined can be represented as a chain lookup structure, in which the key of each chain is the known pattern (e.g., IP address), and the value of chain represents the policy associated with that pattern.

In general the look-up can involve chains or sequences of objects (like elements of one or more alphabets, symbols, numbers, words, images etc.) which are pairwise linked in an key-value scheme (in each pair a key is linked to a value) a sequence of these pairs form a chain.

Security policies are not always static, with new rules being inserted or deleted from time to time. Adding or deleting a rule generally corresponds to modification of a chain lookup structure of patterns by adding or deleting a pattern.

Efficient implementation of a firewall can be enabled by a implementation of a chain search that provides efficient and predictable time lookup of a (key,value) pair, and preferably that can be inserted or deleted from the chain lookup structure, and a value can be looked up for that value.

Access control applications such as firewalls are central to Internet and network security. As an access filter between internal networks and outside networks like the Internet a firewall should apply selection criteria that are as specific as possible while providing high bandwidth. In practice both is difficult to achieve at the same time. In most modern firewalls the rule base is a list and the number of active rules N is carefully observed and limited as the search time increases linearly with N. If N becomes too large the bandwidth drops and the firewall becomes a bottleneck leading to slow and unstable network service. Also the firewall's vulnerability to denial of service attacks increases if N becomes large. The O(N) matching time complexity therefore effectively sets a limit on the size of firewall rule bases. The N-dependence of the space complexity has to be considered as well and is subject to optimization efforts but the more stringent limit is set by the time complexity.

The time complexity is reduced by sorting the rules in the firewall rule base so that the most frequently used rules are listed first. Further most state-of-the-art firewalls apply stateful firewall matching which ensures that if a first packet has been allowed all further packets belonging to the same flow are permitted to cross as well. Usually the state lookup algorithm is significantly faster than the packet matching one. Stateful firewalls are therefore particularly well suited for long packet flows but are less efficient if confronted with a large number of short flows like in SYN-flood denial of service attacks.

Firewall rules can overlap i.e. more than one rule could be matched to a packet. Most modern firewalls apply "first match" semantics i.e. the policy associated with the first matching rule in the list is applied to a packet. To reduce the number of firewall rules and to maintain an acceptable level of specificity this can be exploited by using wildcards and overlapping rules to realize intersections and difference operations on sets of IP addresses or port numbers.

SUMMARY

In one aspect in general, a search and matching approach has a computation time that is time linear in the length of the expression to be matched and essentially independent of the number of rules to be enforced. The approach enables a gate functionality device that can enforce millions of fine-grained security and load balancing policies. In some implementations, the worst case space complexity of this algorithm is estimated to be $O(N(\log N)^2)$ where N is the number of rules. Practically in a realistic scenario up to 10 million 12 byte rules can be stored in less than 1 GB of space in memory and 100 million rules in less than 15 GB. In a testbed built using a Pentium 32 bit processor and a Linux iptables open-source firewall packets are directed to a NFQUEUE queue where the header is matched against the data structure. Within the limits of this user level implementation we find that the matching performance for rules bases up to 10 million rules and up to sending rates of 30 k pps shows no losses while for sending rates up to 70 k pps the losses are small and independent of the size of the rule base. A kernel level implementation is expected to show no packet loss for sending rates up to 100 k pps and 10 million rules on the same equipment corresponding to a matching time of 10 μs. On more recent equipment search times below 0.5 μs with rules bases exceeding 150 million random rules can be achieved. The methods presented here pave the way to the application of millions of fine-grained security policies in access control applications, virus scanning, malware and intrusion detection and enable new approaches to deep packet search.

With this new approach it becomes feasible to efficiently operate fire walls using millions of different rules thus enabling fire walls to manage millions of point to point interactions. Even more importantly these techniques can be used to issue "silent security" alarms for certain connections ("permit and monitor") as well as to implement rich, context dependent load balancing rules. This significant advance allows the implementation of fine grained security policies for networks (e.g., of large organizations) and reduce the need of operating several firewalls in succession. The approach provides a stable implementation using a data structure with an access time which is linear in the length of the searched expression.

In another general aspect, an approach to lookup provides predicable access time and a memory requirement that grows slower than quadratically in the number of key values. In one example, the search time is proportional to the length (l) of the key represented as a string from an alphabet ($\Sigma$), In another general aspect, an approach to lookup (i.e., a lookup, insert, or delete based on a key) makes iterative use element lookup such that if the key is a sequence key=($k_1$, $k_2$, . . . , $k_l$), then a lookup uses a series of lookups ($k_1$, $k_2$)→$e_1$ (where $e_1$ is an index of the edge of the index/value pair), ($e_1$, $k_3$)→$e_2$, . . . , ($e_{l-2}$, $k_l$)→$e_{l-1}$, ($e_{l-1}$, Ø) (where Ø is a terminator character)

In another aspect, in general, a method for accessing data associated with an input string uses a data structure maintained in a memory device (e.g., semiconductor random-access memory). The method comprising performing a first procedure using a first segment of the data structure to access data associated with a pair of data values. The pair of data values has a first value from a first value set and a second value from a second value set. This first procedure includes using the second value to access a part value in a first section of a segment of the data structure. The part value identifies a second section of the segment of the data structure. This identified second section belongs to a set of sections of the segment of the data structure identified by values in the first section of the segment. The first value is then used to access a lookup value in the identified second section. The second value and the lookup value are compared to determine if the pair of data values is represented in the segment of the data structure.

In another aspect, in general, a gate device (110) comprises an input for receiving successive data packets (120, 121), each data packet including a set of values (124) forming a sequence of values of a key. The device also comprises a data structure (150) stored on a machine readable medium of the device comprising a representation of a plurality of rules, each rule being identified by a corresponding key, and matching circuitry (140) for determining whether a rule identified by the key of successive data packets is represented in the data structure. In operation of the gate device, the matching circuitry, for each key of a received data packet, determines whether a series of pairs of values (224, 225) are represented in the data structure. Each pair ((i, v) 224, 225) has a first value (e.g., i=$k_1$, i=$e_{i-1}$) representing a prefix of the sequence of values forming the key, and a second value (e.g., v=$k_2$, v=$k_{i+1}$) representing the value following said sequence. In operation of the gate device, the matching circuit determines whether each pair of values ((i, v)) is represented in the data structure by using the second value (v) of the pair to access a part value (g=G[v]) in a first section (G) of a segment (152) of the data structure (150). The part value (g) identifies a second section (e.g., a column of a matrix M[*,g]) of the segment of the data structure, said data section belonging to a set of sections (e.g., matrix M) of the segment of the data structure identified by values of the first section of the segment. The first value (i) is used to access a lookup value (e.g., a matrix entry $\tilde{v}$=M[P[i],g]) in the identified second section, and the second value (v) and the lookup value ($\tilde{v}$) are compared to determine if the pair of data values ((i, v)) is represented in the segment (152) of the data structure (150). The device further comprises an output for selectively passing the data packets (120, 121) according to output of the matching circuitry.

In another aspect, in general, a method for accessing data associated with an input string uses a data structure (150) maintained in a memory device. The method comprise performing a first procedure using a first segment (152) of the data structure to accessing associated with a pair of data values (224, 225), the pair of data values ((i, v)) having a first value (i) from a first value set and a second value (v) from a second value set. The first procedure includes the following steps. The second value is used to access a part value (g=G[v]) in a first section (G) of a segment of the data structure, the part value (g) identifying a second section (M[*, g]) of the segment of the data structure, said data section belonging to a second section (M) of the segment of the data structure identified by values of the first section of the segment. The first value (i) is used to access a lookup value ($\tilde{v}$=M[P[i],g]) in the identified second section. The second value (v) and the lookup value ($\tilde{v}$) are compared to determine if the pair of data values ((i, v)) is represented in the segment of the data structure.

A further non-essential feature of the method is that the first value (i) is used to access a lookup value ($\tilde{v}$) by using the first value to access a value (p) in a third section (P) of the segment of the data structure. The value (g) from the first section (G) and the value (p) accessed from the third section (G) are then used to access the lookup value ($\tilde{v}$).

Another non-essential feature of the method is that the first value (i) is used to access a further value (c) in the third section (P). The further value is used to select the first section (G) and the second section (M) from a plurality of instances of said first and second sections in the first segment.

The method may be used to process an input steam. A method for accessing the data associated with the input stream comprises repeatedly performing the first procedure with successive pairs of data values, in each pair of data values the first value (e.g., i=$k_1$, or i=$e_{i-1}$) representing a prefix of the input string and the second value (e.g., v=$k_2$, v=$k_{i+1}$, or v=*) representing an element of the string following the prefix.

Aspects can include one or more of the following non-essential features.

The second value represents a wildcard (v=*).

The first procedure further includes using the first value (i) to access further value (e) in the second section, and the further value is used as a first value (i=e) of a data pair ((i, v)) in a subsequent application of the first procedure in accessing the data associated with the input string.

Each performing of the first procedure uses a distinct segment (152) of the data structure (150).

The data structure includes a plurality of arrays of storage values, wherein the first section comprises an array indexed by the second value set and each section of the set of sections comprises an array indexed by the first value set.

Each array indexed by the first value set comprises storage elements for holding values of the second value set.

The segment of the data structure represents a bipartite graph, wherein
  the graph has a first set of nodes and a second set of node,
  each node of the first set of nodes is associated with a value from the first value set,
  each node of the first set of nodes is linked by an edge of a plurality of edges of the graph to at most one node of the second set of nodes,
  each node of the second set of nodes is associated with a different value from the second value set,
  each edge of the plurality of edges of the graph is associated with a different pair of the plurality of pairs of a first value and a second value, and each pair of the plurality of pairs of a first value and a second value is associated with a different edge of the plurality of edge of the graph,
  the graph has a one or more parts, each part comprising a disjoint subgraph, the data structure having a plurality of parts with each part of the data structure representing a different part of the graph, and
  the nodes of first set of nodes in any disjoint subgraph of the one or more of parts is associated with different values from the first value set.

Using the first value to access the part value in the first section of a segment of the data structure comprises selecting one of the disjoint subgraphs.

Using the second value to access the lookup value comprises identifying an edge from a first node associated with the first value, and using a value associated with a second node coupled to the first node by the edge to determine the lookup value.

Comparing the second value and the lookup value comprises determining whether the second value and the value associated with second node are equal.

The input string comprises a sequence of elements characterizing a unit of communication, and the method includes receiving the unit of communication, and then processing the unit of communication according to the accessed data associated with the input string. For example, the unit of communication comprises a unit of data network communication.

The sequence of elements include elements of a network address. For example, the network address comprises an address of an endpoint of the data network communication.

The sequence of elements include an element characterizing a communication protocol.

In another aspect, in general, a method for maintaining a data structure stored in a machine-readable memory. The method includes determining using a circuit-implemented device whether first (index, value) pair is represented in the data structure. This determining includes looking up a first part number according to the index in a first memory section, looking up a stored value according the index in a second memory section selected according to the first part number, and comparing the value with stored value and the value of the first (index, value) pair.

The method can further comprise inserting using the circuit-implemented device a second (index, value) pair to be represented in the data structure. The inserting includes determining a second part number according to pairs currently represented in the data structure, and storing the value of the second (index, value) pair according to the index of said pair in a third memory section selected according to the second part number.

The method can further comprise deleting using the circuit-implemented device a third (index, value) pair to be represented in the data structure. The deleting includes looking up a third part number according to the index of the third (index, value) pair in a first memory section, and clearing a location according the index of the third (index, value) pair in a third memory section selected according to the third part number.

In another aspect, in general, software embodied on a non-transitory machine readable medium comprises instructions for causing a processor to access data associated with an input string using a data structure maintained in a memory device according the all the steps of any method set forth above.

In another aspect, in general, a communication processor for processing units of communication is configured to process input strings that each comprises a sequence of elements characterizing a unit of communication.

In another aspect, a search and matching system for a computer memory includes means for configuring said memory according to a data structure (150). The data structure comprise a plurality of segments (152). Each segment includes a first section (G) that includes a plurality of entries. Each entry is associated with a different second value. Each entry storing a part value identifying a second section (column of M) of a set of second sections of the segment (matrix M). Each second section of the set of second section comprises a plurality of entries, each entry being associated with a different first value Each entry stores a lookup value associate with a combination of a first value and a second value. The combination of the first value and the second value is represented in the segment if the lookup value matches the second value. The system further includes means for determining if a combination of a first value and a second value is represented in the data structure.

In another aspect, in general, a method for search and matching in a computer memory includes configuring said memory according to a data structure (150), said data structure comprising a plurality of segments (152), each segment including a first section that includes a plurality of entries, each entry being associated with a different second value, the entry storing a part value identifying a second section of a set of second sections of the segment, wherein each second section of the set of second section comprises a plurality of entries, each entry being associated with a different first value, the entry storing a lookup value associate with a combination of a first value and a second value, and wherein the combination of the first value and the second value is represented in the segment if the lookup value matches the second value. The method further includes determining if a combination of a first value and a second value is represented in the data structure.

Although the technical problem of accessing data according to an input string may be addressed in a variety of existing computer-implemented systems, the approaches set forth above are not conventional. The approaches solve the technical problem in a manner that improves the functioning of a software-implemented apparatus providing a combination of one or more of the advantages of (a) reduced computation time, (b) predictable computational timel, and (c) reduced memory requirement as compared to existing methods. Furthermore, the details of the methods for solution set forth above do not arise in conventional methods string-based data access. The computational building block that provides the technological improvement for pair-based and/or string-based access of values is applicable to a wide range of practical applications, including processing of data communication. At least some embodiments of the approaches improved technology by enabling processing rates for units of data communication that far exceed the rates attainable by convention techniques.

One or more aspects may have the following advantages.

As applied to a firewall use case, a matching time is enabled that is independent of the number of rules N in the firewall rule base and that scales linearly with the length l of the chain. The data structure is build by representing the chains as concatenated bipartite (index-value) pairs and is thus referred to as Bipartite Concatenated Representation (BCR). The space complexity in this application scenario can be approximated as $O(N \log^2 N)$ which is a significant improvement over usual constant time approaches which have a space complexity of $O(N^2)$ or worse. This significant reduction in space complexity renders constant time approaches practical for many chain matching applications.

BCR rule bases are by design conflict free and the performance is independent of the ordering of the rules which significantly reduces the complexity of managing and maintaining a BCR implementation. Furthermore, knowledge of the rule base will not be of use to an attacker rendering the BCR immune to algorithmic complexity attacks. The BCR can be used to match all desired fields: once the fields of interest are selected the field specific values to be matched just need to be concatenated into a single chain in which each field is represented by a fixed number of characters. Then the corresponding chains can be stored in the BCR. The BCR also can accommodate wildcards as discussed below.

The BCR can be used to match all desired fields: once the fields of interest are selected the field specific values to be matched just need to be concatenated into a single chain in which each field is represented by a fixed number of characters. Then the corresponding chains can be stored in the BCR. In some implementations, the BCR can accommodate wildcards under the constraint that these do not give rise to "collisions".

Note that parenthesized reference numerals and parenthesized symbols (e.g., mathematical symbols) refer to examples in the description and figures, and should not be construed to limit the scope of the approaches described.

Other features and advantages of the invention are apparent from the following description, and from the claims.

DESCRIPTION OF DRAWINGS

FIG. 6 is a representation of the set of index-value pairs in an indexed matrix form.
FIG. 7 is a representation of the set of index-value pairs in a clusted indexed matrix form.

DETAILED DESCRIPTION

Overview

Figure 1:
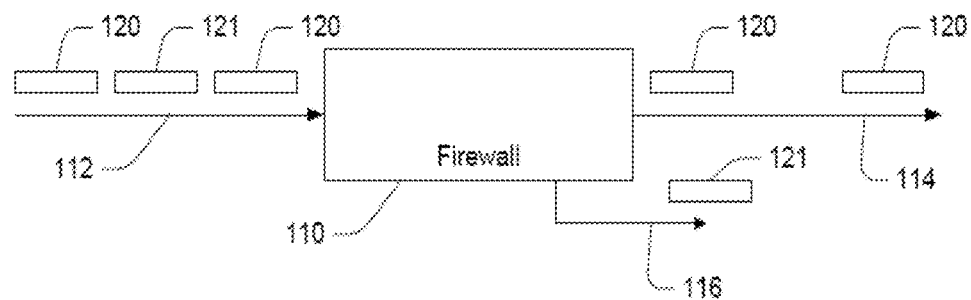
FIG. 1 is a block diagram showing a firewall.

Referring to FIG. 1, in one use of a fast chain lookup, a firewall 110 inspects data packets 120, 121 that arrive on an input link 112, and according to a security policy implemented by the firewall passes certain packets 120 that are permitted by the security policy on a output link 114. Packets 121 that are not accepted by the policy are either deleted, or as illustrated may be passed on a link 116 allocated for such not accepted packets. It should be understood that the configuration shown in FIG. 1 is only representative, and the techniques described below can be applied to other gate devices, for example, with different configurations of input and output links, or to devices that are not necessarily gate devices.

Figure 2:
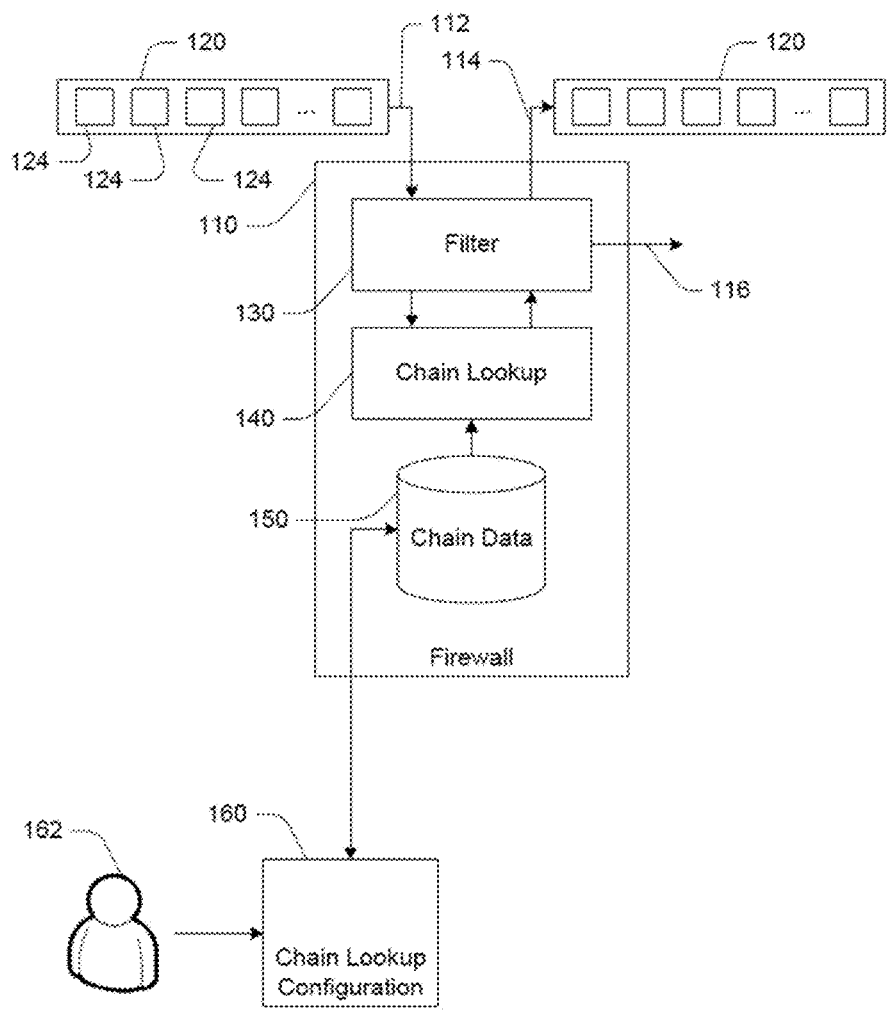
FIG. 2 is a block diagram showing a firewall.

Referring to FIG. 2, for the initial description below, each packet 120 (or 121) includes a sequence of values 124, for example, the values 124 being successive parts of a numerical network address, or successive characters of a text host name. In the discussion below, these values are referred to as "index" values, and the entire sequence is referred to as the index chain, or index (or "key") for short. Generally, the firewall includes a filter 130, which accepts each input packet 120, extracts one or more index chains from the packet, and uses a chain lookup 140 to determine if there is a security policy associated with the index chain. Then based on any security policies returned from the chain lookup, the filter 130 either passes the packet on the output link 114, or link 116 for the rejected packets.

Continuing to refer to FIG. 2, the chain lookup 140 makes use of chain data 150, which is stored in (of efficiently accessible from) the firewall 110. This data provides the association of index chains and security policies, which enables the chain lookup 140 to respond to a chain provided by the filter 130 by either indicating that the chain is not present in the chain data structures, or if it is present, by providing the value (e.g., a reference to a security policy) associated with that chain. The chain data 150 is configured (e.g., compiled) by a chain lookup configuration element 160, which accepts instructions from an administrator 162, for example, to add or remove chains and associated policies from the chain data.

An important aspect of the chain lookup approach is the nature of the data structures used to encode the index values of the chains and their associated lookup values. Referring to FIG. 2, a representative index chain $(k_1, k_2, \ldots, k_l)$ is passed to the chain lookup 140. Internally, the lookup is implemented as a series of lookups of pairs of index values. At the first stage, a lookup 240 considers the pair $(k_1, k_2)$ using a first part of the chain data 150. This lookup in the series essentially uses a separate part of the chain data. Assuming that $(k_1, k_2)$ is present in the part of the chain data, the associated value $e_1$ is found in that part of the chain data. Then the pair $(e_1, k_3)$ is passed to a second lookup 240, which uses part of the chain data to either determine that the pair is absent from the chain data, or to determine a value $e_2$. This continues to the end of the string, finally looking up $(e_{l-2}, k_l)$ and a terminator pair $(e_{l-1}, \emptyset)$, which guarantees that $(k_1, \ldots, k_l)$ is not merely a prefix for another chain. Note that if the chains are of a fixed length, or if there are other indicators that a valid string terminates at $k_l$, such a termination pair is not required. Assuming that all the pairs are found, the final value of the lookup 240 provides the overall return value for the index string. In some implementations, the lookup may be performed in a pipelined manner whereby a second string begins processing after the first lookup 240 completes evaluation of the first index pair.

Figure 3:
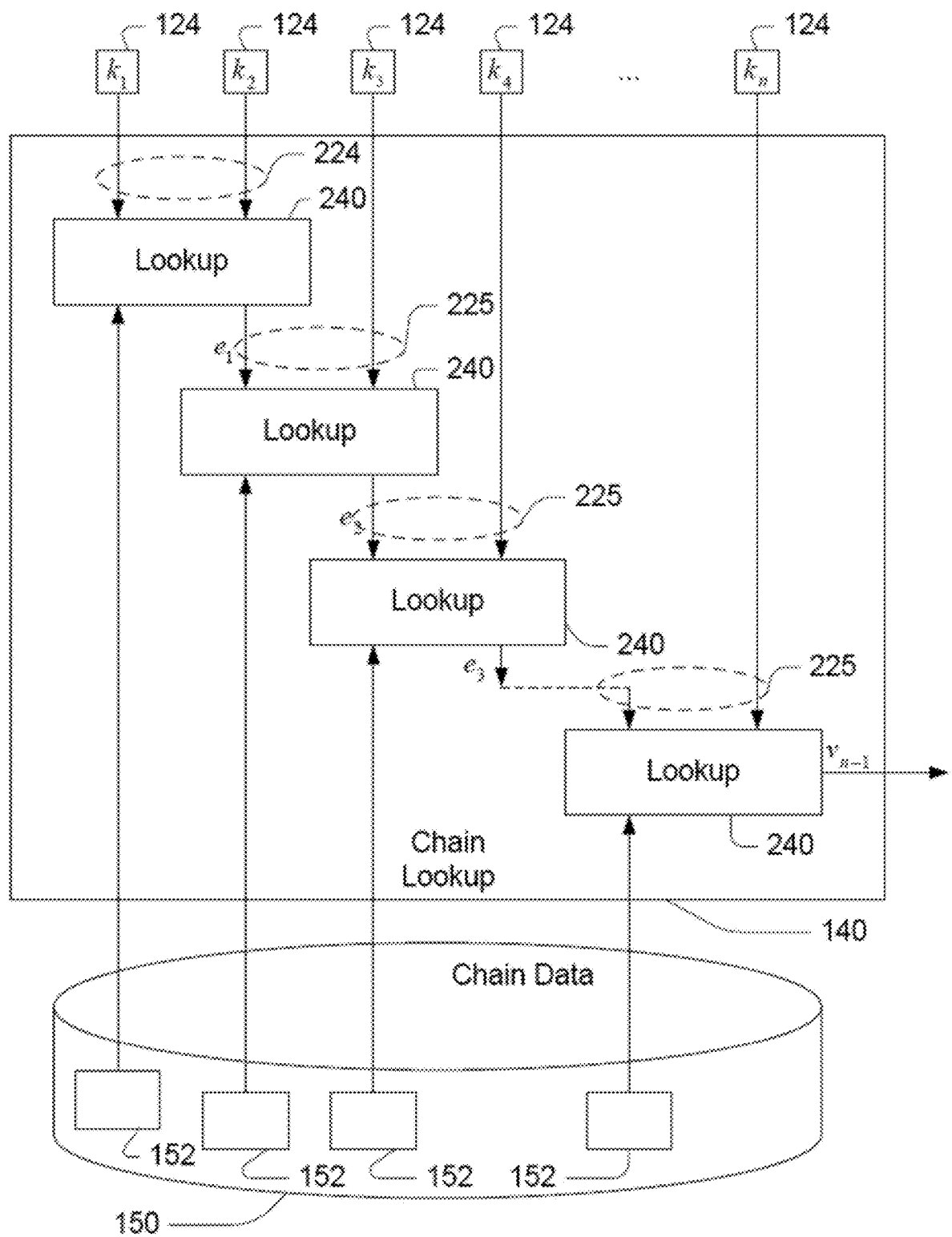
FIG. 3 is a block diagram of a chain lookup.

Before returning to a discussion of the implementation of the chain lookup 140 for an entire index chain, a description of an implementation of the constituent lookups 240, as illustrated in FIG. 3 is presented. A lookup 240 can be considered to have an input of a pair (i, v), referred to as an "index-value" pair, and to access a segment 152 of the chain lookup structure 150 to determine if that pair is present. For example, for the first stage lookup 240, the input pair 224 is (i, v)=($k_1$, $k_2$) and the lookup determines if there are any index chains that consists of or begins with the same two values ($k_1$, $k_2$). At the second stage, lookup 240 has an input pair 225 (i, v)=($e_1$, $k_3$). The index $e_1$ is unique to the initial sequence ($k_1$, $k_2$), therefore ($e_1$, $k_3$) is found in the second part of the chain data if at least one index chain consists of or begins with ($k_1$, $k_2$, $k_3$). In the exposition below, merely by way of example, we assume that the first element i belongs to a set of bounded positive integers, and that v is a valid hostname characters (e.g., a-z, 0-9, "-", and ".").

The data storage for the active (i, v) pairs can be represented as a bipartite graph in which a first set of nodes are labeled with index values (e.g., integers) and a second set of nodes are labeled with, for example, English letters. In the second set, no two nodes have the same label. An (i, v) pair is active if and only if an edge joins an index node with label i and the only value node with label v. This representation is referred to as Bipartite Concatenated Representation (BCR), without intending any connotation to this designation.

The BCR Data Structure

As introduced above, the BCR is constructed in such a way that it enables the fast lookup and efficient storage of chains ($k_1$, $k_2$, . . . , $k_l$) of elements $k_i$. Each element $k_i$ in a chain ($k_1$, $k_2$, . . . , $k_l$) may stem from finite sets of distinguishable items of various cardinality. In the present approach a chain ($k_1$, $k_2$, . . . , $k_l$) is stored pairwise where each pair is mapped to an edge index $e_i$ in the following way: ($k_1$, $k_2$)→$e_1$, ($e_1$, $k_3$)→$e_2$, ($e_2$, $k_1$)→$e_3$, . . . , ($e_{l-2}$, $k_l$)→$e_{l-1}$. In a first step we describe how very simple chains that consist just of single index-value (i, v) pairs are stored efficiently. We then move on to the representation of chains of pairs.

Pair Entry and Lookup

Figure 4:
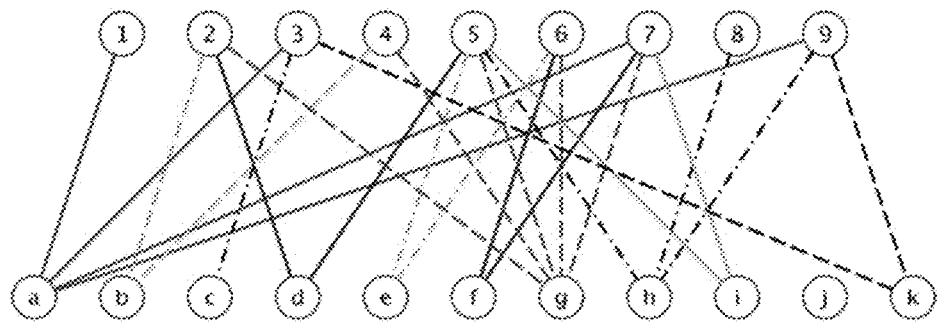
FIG. 4 is a representation of the set of index-value pairs as a bipartite graph.

The basic (i, v) pairs to be stored have the following structure: i is an index value, from a set I (e.g., positive integers less than a fixed maximum) and the values v are from a set Σ. The (i, v) pair storage can be represented as a bipartite graph in which a first set of nodes are labeled with "index" values (e.g., integers) and a second set of nodes are labeled with the "value" values (e.g., letters). Such a graph may be constructed and stored in the data structure assuming that pairs are entered successively. As an example we use the pairs enumerated below, the corresponding bipartite graph is shown in FIG. 4. In this example I={1, 2, 3, 4, 5, 6, 7, 8, 9} and Σ={a, b, c, d, e, f, g, h, i, j, k}. In this example, it is assumed that these pairs are entered into the BCR successively as (1, a), (2, b), (3, c), (3, a), (7, a), (6, e), (4, b), (5, e), (9, a), (4, g), (6, g), (2, g), (3, k), (5, i), (2, d), (9, h), (5, h), (9, k), (5, g), (5, d), (6, f), (7, i), (7, g), (7, f), (8, h).

Building Groups

Figure 5:
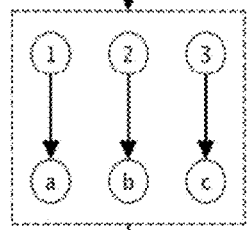
FIG. 5 is an illustration of successive addition of index-value pairs.
Figure 5:
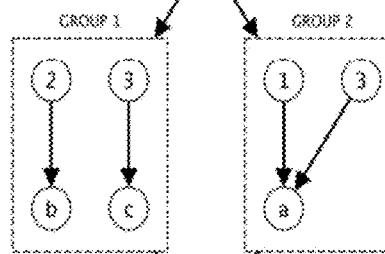
Figure 5:
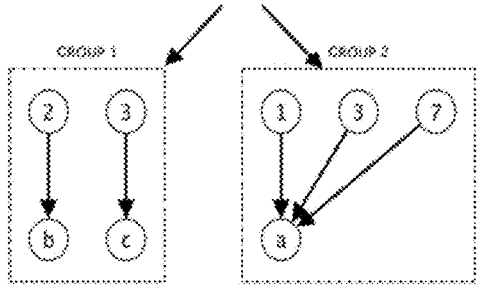

Formation of "groups" of the data structure (also referred to as "parts" of the data structure) provides a mechanism by which in each group each index node has only a single edge from it. Referring to FIG. 5, this constraint can be understood in the example above in which after the (i, v) pairs (1, a), (2, b), (3, c) are inserted, the graph has three index nodes, labeled 1 through 3, and three value nodes, labeled with a through c, and three edges between the respective nodes. These three pairs of nodes form a part labeled "Group 1". When a new pair (3, a) is inserted, it is not possible to simply insert an edge from the index node labeled with 3 to the existing value node labeled with a without violating the constraint because that would result in the 3 node having two edges, one to c and one to a. Instead, a further index node with a label 3 is created, and both the existing 1 index node and the new 3 index node are linked to the a value node. The node a is removed from the original group of the graph to form a new group, labeled "Group 2", along with the index nodes that are linked to it. If a new pair (7, a) is added, it is added to the second group.

The graphs shown in FIG. 5 are only one representation of the data structure. Another representation is in a vector/matrix (i.e., one/two dimensional array) form. One section of the data structure holds a vector G[v], which is indexed by values v∈Σ and provides the identifier, in these examples, a number, of a group of the graph in which a value node corresponding to v is present. The group number identifies a column in a matrix M. Another section of the data structure holds a second vector P[i], which is used to map an index i to the row of M for that index. In this way, the matrix M does not have to include many rows that would be completely empty. For instance, as a new index is used if a (i, v) pair is inserted into the data structure, a further row of M may be allocated, and the entry of P for that newly used index is used to refer to the newly allocated row. The parts P[i], G[v] and the M matrix corresponding to the insertion of all the pairs illustrated in FIG. 4 are shown in FIG. 6. For example to verify that (9, a) is present one obtains p=P[9]=8, then one determines that g=G[a]=2 and finally one finds that M[8][2]=a. Because that entry has the same value as provided to the lookup, the lookup function declares that (9, a) is represented in the data structure. Each edge in the graph is assigned a unique identifier, in this case an integer. The entries of the matrix M Identifies both the value v as well as the edge identifier e associated with the (i, v) pair. The edge identifier is denoted in the matrix entries as a subscript, as $v_e$.

Therefore, if the G and P vectors are maintained in this manner, determining if a (i, v) entry is in the data structure corresponds looking up $\tilde{v}$=M[P[i]] [G[v]] and to the test $\tilde{v}$=v, which takes a fixed amount of time (i.e., to look up p=P[i], followed by looking up g=G[v], followed by a retrieval of $\tilde{v}$=M[p][g], followed by the test to see if $\tilde{v}$=v). Storage for the P and G vectors requires fixed space for |I| and |Σ| entries, respectively.

Building Clusters

The procedure described so far still does not necessarily ensure that the matrix M will be sufficiently dense to guarantee an efficient representation of the data structure in terms of space constraints. Although not essential, a further improvement effectively splits the data structure in several clusters each with its own G and M matrices. The M matrices in different clusters generally are of different sizes (i.e., different numbers of rows and columns), and together can provide an improved storage density. Very generally, this step limits the maximum degree $\delta_{max}$ of all value nodes in each array. When insertion of an (i, v) pair would cause the degree $\delta_v$ of a node for value v to exceed $\delta_{max}$ the bipartite graph is divided into two clusters (indexed by c) by moving the index node (more generally one of the index nodes associated with that specific value) and the associated row of the matrix M to a new cluster of the overall graph. In this implementation the P vector has entries that are pairs (c, p) to indicate both the cluster c and the associated row p in the corresponding $M_c$ matrix. To illustrate this implementation we use the same example as above with $\delta_{max}=3$: the resulting P, G and M matrices are shown in the tables shown in FIG. 7. Also, Lookup of a pair works essentially as described above, one must just refer to the G and M matrices of the specific cluster indicated by P[i].

Of course, numerous optimizations of this sequence of steps can be performed, and it is not necessary that P, G and M necessarily store integer indices. For example, precomputed addresses (i.e., pointers) are used. There are also several possibilities to implement the $\delta_{max}$ cut off. In many applications it is sufficient to heuristically chose a suitable limit on the order of (but not necessarily exactly equal to) log N where N is on the order of the number of nodes in the bipartite graph. The size of the data structure obtained appears in practice to be fairly independent from the exact choice of this number. Note, that as entries are inserted or deleted from a lookup data structure, the clusters may be redefined to maintain the density of the entries.

Pair Concatenation

To express a chain of fixed or variable length greater than two $(k_1, k_2, k_3, \ldots)$ in the BCR an edge index is assigned to a first pair $(k_1, k_2) \rightarrow e_1$. The set of all edges constitutes the set of index nodes to which the next element of the chain $k_3$ is linked as a value node forming a pair $(e_1, k_3)$ which is then assigned a new edge index $(e_1, k_3) \rightarrow e_2$. Therefore to every key value pair (i.e. to all edges in the bipartite graph) an edge index e(i, v) is assigned as the pairs are added to the data structure. This can be achieved by a simple counter (one for each level m of the data structure) which is used to associate to each inserted pair an edge number which is stored as part of the pair's entry in the cells of the M matrix The next value(s) are then linked to these keys forming a new (2nd level) bipartite graph.

After the sequence $(k_1, k_2, \ldots, k_n)$ is determined to be present by repeating the procedures described in the previous section there remains an issue of determining whether this sequence is merely a prefix of a valid entry of the chain lookup structure but not a entry itself, or whether it is a valid entry itself. One solution, which may not provide the greatest efficiency is to introduce a termination value for each string, for example, rather than searching for the sequence $(k_1, k_2, \ldots, k_n)$, a sequence $(k_1, k_2, \ldots, k_n, \emptyset)$ is searched for.

As introduced above, the entries of the M matrices may include ancillary data in addition to the values that are used to determine the presence of the (i, v) pairs. A flag value M[i,g].f can indicate situations whether the current string is the prefix of at least one longer string, and/or whether the current string is itself a valid string in the chain lookup structure. In some implementations, use of such a flag may obviate the need to use a termination pair as introduced above. For example a two-bit flag could indicate one of the following situations: a flag 11 may indicate that another value follows in at least one next pair, a flag 01 may indicate that no value follows and the flag 10 may indicate that one chain ends but at least another—so far identical—one still continues.

As described above for insertion of pairs simple counters are used (at each level of the data structure) to assign an edge number to each pair which is newly inserted. In some implementations, for key sequences of at most length L, there are L graphs that are used for the primitive index value pair lookups. Although the size of the value set $|\Sigma|$ may be known for each graph, the size of the index set for each graph is determined by the number of edges in the previous graph.

Insertions into the BCR are also done in a sequence. Suppose that for a new chain=$(k_1, k_2, \ldots, k_l)$, there is a prefix $(k_1, k_2, \ldots, k_m)$ of a previously inserted entry (m<l) and that the pair $(e_m, k_{m+1})$ is absent from the $m^{th}$ graph. Thus in the matrix at level m−1 the $k_m$ associated with the prefix $(k_1, k_2, \ldots, k_m)$ has been identified and the corresponding edge index $e_{m-1}$ is read. Then the flags associated with this specific $k_m$ in the m−1 level matrix are changed (if necessary) and the pair $(e_{m-1}, k_{m+1})$ is inserted into the appropriate couple matrix at level m. To this entry a new edge index $e_m$ is associated (based on the counter reading for level m) and an appropriate flag is set, both stored together with the value in the relevant couple matrix. This continues until the $l^{th}$ graph where the pair $(e_{l-1}, k_l)$ is inserted and the final flag is set to indicate the end of the chain.

Deletion of a chain=$(k_1, k_2, \ldots, k_l)$ can be accomplished in several ways. If the entire entry should be conserved in the data structure one can introduce a new flag marking the last element of the chain that should be deleted. If a subchain of an existing chain is to be deleted (e.g. delete "Chris" but keep "Christian") then the 10 flag associated with the (i, s) pair is modified to indicate that "Chris" is a prefix but not an entry itself. If all key-value pairs of an entry should be deleted in the data structure one needs to determine the last (edge, value) pair in the sequence with more than one "child". If this node has been identified one can remove all further elements of the sequence from that node on.

Note that although the primitive lookup procedure is described so far in the context of integer indexes and character values, other enumerable sets may be used for the indexes and values. For example, the indexes may be characters. The index and/or values may be tuples of items. The index and/or values may be represented or representable as fixed length bitvectors.

BCR for Firewall Rules

In one embodiment, the data structure is implemented as follows. A firewall rule is the concatenation of the fields shown in the following table.

| Description | Abbreviation | Space |
|---|---|---|
| Source IP address | SIP | 32 bit |
| Destination IP address | DIP | 32 bit |
| Source port number | SPort | 16 bit |
| Destination port number | DPort | 16 bit |

Thus a chain could take the following form (SIP, SPort, DIP, DPort). In an implementation 30 bits are used for the indexes and 16 bits for the values and therefore the IP's are split in two 16 bit numbers. Then the (SIP, SPort, DIP, DPort) chain can be stored as for example as:

| | |
|---|---|
| (SIP[bits16-31], SIP[bits0-15]) → | $e_1$ |
| $(e_1$, SPort) → | $e_2$ |
| $(e_2$, DIP[bits16-31]) → | $e_3$ |
| $(e_3$, DIP[bits0-15]) → | $e_4$ |
| $(e_4$, DPort) → | $e_5$ |

The actual order of the 16 bit numbers is permuted for each specific implementation of the data structure.

Suffix Optimization

In the implementation realized in this work each chain is inserted into the BCR as described above, however, only until the first difference between the chain to be inserted and the chains already included in the BCR occurs. The last edge index used for each chain in the data structure is then linked via a "residua table" to the remainder of the chain. If a new chain is inserted and there is complete overlap with an existing chain up until the edge that points to the residua table the pairwise representation of the existing chain is extended until the first difference between the new and the existing chain occurs. The edge indices of these distinguishing pairs are then linked to the corresponding residua in the residua table.

Example

Assume that the rules given in the following table were to be inserted into the BCR Represented as chains (in hexadecimal and sorted as indicated above) the rules can be

| SIP | SPort | DIP | DPort |
|---|---|---|---|
| 10.1.0.1 | 0 | 10.0.0.1 | 0 |
| 10.1.0.1 | 9 | 10.0.0.10 | 8 |
| 10.1.0.1 | 0 | 10.0.0.9 | 5 | written as:

| 0A01 | 0001 | 0000 | 0A00 | 0001 | 0000 |
|---|---|---|---|---|---|
| 0A01 | 0001 | 0009 | 0A00 | 000A | 0008 |
| 0A01 | 0001 | 0000 | 0A00 | 0009 | 0005 |

Figure 8:
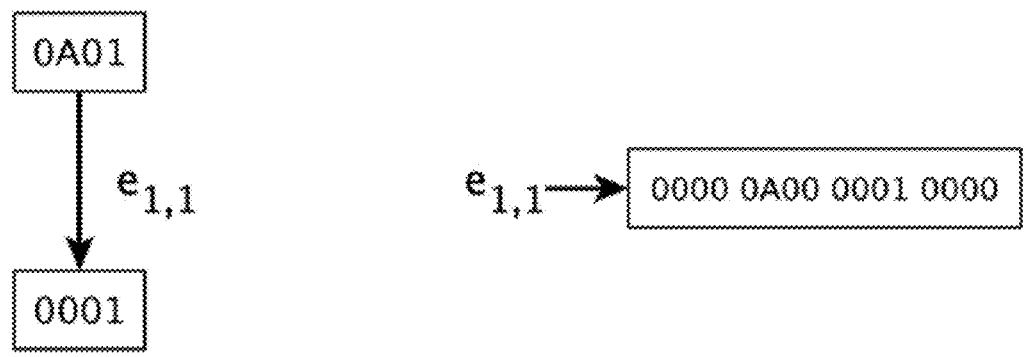
FIG. 8 is an example of BCR rules with suffix optimization.
Figure 8:
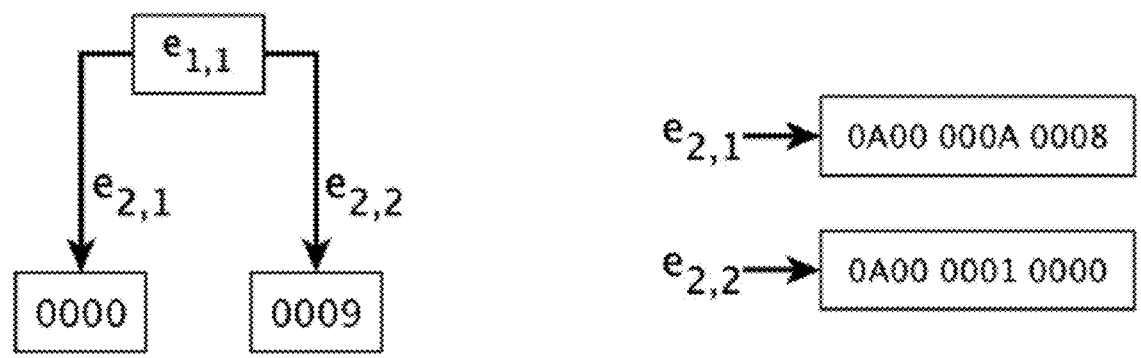
Figure 8:
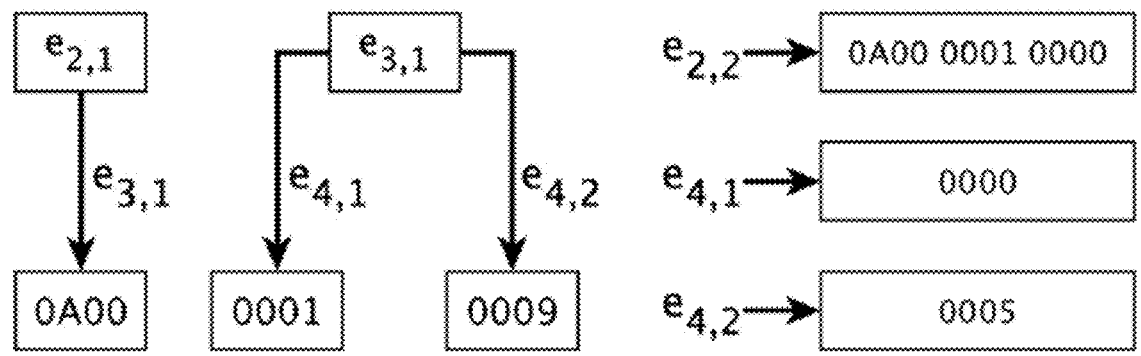

The rules are entered as shown in FIG. 8. When the first rule is inserted node 0A01 is linked to node 0001 via the edge labeled $e_{1,1}$. (Edges at the $n^{th}$ level are denoted by $e_{n,*}$.) The edge $e_{1,1}$ then points to the remaining part of the rule which is stored in the residua table (see FIG. 8, part a). Note that only the first index-value pair of the rule 1 has been entered in the regular BCR. Now consider including the second rule. The first difference between the first and the second rule appears in the subsequent SPort bits. Therefore edge $e_{1,1}$ is linked both to the subsequent SPort bits 0000 of rule 1 and 0009 of rule 2 via the second layer edges $e_{2,1}$ and $e_{2,2}$. Instead of $e_1$ now $e_{2,1}$ points to the remaining bits of rule 1 in the residua table and $e_{2,1}$ points to the remaining bits of the rule 2 (see FIG. 8, part b). Consider adding the third rule. Connecting $e_{2,1}$ to node 0A00 does not lead to a difference between rule 1 and rule 3 in the BCR and thus the BCR is extended by another layer. Finally, after adding 0001 from the first rule and 0009 from the second rule the edges $e_{4,1}$ and $e_{4,2}$ point to residua table entries 0000 and 0005, respectively (see FIG. 8, part c).

Wildcards

In the description above, rules generally take the form of explicit sequences of tokens. For example, a first rule R1 may be associated with a sequence (a, b, x), and a second rule R2 may be associated with a sequence (a, b, y). In the approach described above, if an input sequence begins with a prefix other than (a, a), then the system determines that there is no rule that will match the entire sequence. If the input sequence begins with (a, b), then this pair yields the first level edge identifier $e_1$. If the input sequence was (a, b, c) then the system would look up ($e_1$, c) at the next level and determine that that pair is absent, and therefore (a, b, c) does not match any rule. However, if the input sequence was (a, b, x), then the lookup of ($e_1$, x) would find rule R1 and the system could act on that rule.

In some cases, it is desirable to be able to specify a rule using a "wildcard" in place of an explicit symbol at one or more places in the rule's sequence. For example, a rule R3 may match a pattern (a, *, z), where "*" is the wildcard symbol, so that input sequences (a, a, z), (a, b, c) etc. all would match the rule. One approach is to introduce all pairs (a, a), (a, b), . . . , (a, z) at the first level so that effectively, the wildcard is "compiled" into the BCR database when the rule is introduced.

Another approach to introducing the wildcard is to explicitly introduce a pair (a, *) at the first level, in this example associated with an edge $e_2$. If the input sequence is (a, a, z) is input, then a search at the first level for the explicit sequence (a, a) fails to match any rule explicitly, but a second search for a pair (a, *) would match. At runtime, at each position, two searches may have to be performed, one with an explicit token from the input sequence and one with a wildcard symbol. In general, implementations that make use of wildcards use the convention that the presence of an explicit rule overrules a match with a wildcard. In this way, one can assure that the search time remains constant in the length of a string. Although it would be feasible to consider multiple matches and the search approach, following such multiple "paths" may negate some of the advantage such constant or predictable processing time.

In some cases, a prefix of a wildcard rule and an explicit rule effectively "overlap." For example, be three rules in the system: R1: (a, b, x); R2: (a, b, y); and R3: (a, *, z). If the input chain for lookup is (a, a, z) then on the first level the edge $e_2$ is found for (a, a) corresponding to rule R3. However, if the input is (a, b, z), then on the first level, a search for (a, b) cannot distinguish between the three rules. Had an explicit rule (a, b, z) been entered rather than rule R3, then the edge $e_1$ found by the search for (a, b) would also yield a match for the second level search for ($e_1$, z).

In an implementation of wildcards, effectively a hybrid compilation and wildcard search approach is taken. Rather than expanding the wildcard rule to all possible tokens when the rule is entered (e.g., at "compile time"), it is expanded only to those tokens that correspond to prefixes of explicit rules. That is, when rule R3: (a, *, z) is entered, effectively rule R3/b: (a, b, z) is also entered, so that the prefix (a, b) is extended according to the approaches described above. Furthermore, a pair (a, *) is added at the first level essentially for the purpose of matching all input tokens matching the wildcard other than b. That is, the input is (a, a, z), at the first level, the successful search for (a, *) would be extended, while if the input is (a, b, z), at the first level, the successful search for (a, b) would be extended. Note that if a further rule is added after a wildcard rule, for example with a fourth rule R4: (a, c, x), then a rule R3/c: (a, c, z) would effectively have to be added to account for the earlier added wildcard rule.

This approach to use of wildcards can be extended to restricted wildcards. For example, if a wildcard $*_1$ only matches the tokens (a, e, i, o, u), and another wildcard $*_2$ matches tokens (x, y, z), then a rule may be written using such wildcards. That is, each token may match one subset wildcard $*_k$ and may match a full wildcard *. At runtime, if an input sequence (a, a, z) with the rules discussed above rules were received, at the first level, first (a, a) is searched for, then if not successful, (a, $*_1$) is searched for, and if unsuccessful (a, *) is searched for. When a rule, for example, R5: (a, $*_1$, v) is entered, then because b does not match $*_1$ the first level pair (a, b) does not have to be extended because (a, b, v) would not match the new rule.

Range-Based Wildcards

Another type of wildcard permits specification of ranges of input symbols, rather than an unrestricted wildcard, or a wildcard restricted to a particular set. The approach is first described in the case lookup of a particular (i, v) pair when the stored data is made up of entries that either have singleton values as described above, as in (i, v), or have range values, as in (i, [$v_1$, $v_2$]). It should be understood that an entry with such a range can be expanded into an explicit set of entries (i, $v_1$), (i, $v_1$+1), . . . , (i, $v_2$−1), (i, $v_2$). However, such an expansion would add a separate column to the M matrix for each value of the range. The range might have hundreds of values, which would greatly reduce the efficiency of the approach.

Generally, an approach to handle ranges is based on a decomposition of the ranges for all the values of pairs in the stored data into non-overlapping ranges such that any range of values for a pair that is added to the stored data can be represented as union of a subset of the non-overlapping ranges. The result is that each of the non-overlapping ranges is associated with at most one column of the M matrix.

As an example, consider the following pairs making up the stored data:

P1: (1, c), P2: (2, [b, e]), P3: (1, [d, e])

for which the non-overlapping ranges can be chosen to be [b, c] and [d, e]. Including the single values, the values can essentially be divided into parts c, [b, c]-{c}, and [d, e]. Essentially, P2 is broken up into P2/c, P2/[b, c]-{c} and P2/[d, e]. A matrix representation of these three pairs is

|    | a | b | c | d | e |
|----|---|---|---|---|---|
| G: |   | 2 | 1 | 3 | 3 |
|    |   | 1 |   | 2 | 3 |
| M: | 1 |   | c |   | [d, e] |
|    | 2 |   | c | [b, c] − {c} | [d, e] |

When looking up an input pair, for example, (2, b), to see if it matches a stored pair, the value b maps to column 2 according to G. Then M[2,2]=[b, c]-{c} is returned. Because the returned is a range, the value b is tested for inclusion in the range (i.e., rather than equality), which because this test is true, the index-value pair (2, b) is deemed to be present in the stored data.

Note that the G vector is essentially a constant-time access data structure of the association c→1
[b, c]-{c}→2
[d,e]→3

Furthermore, for the purpose of testing membership in the range, it is not necessary to encode the omissions of values from the range, and therefore the M matrix entries can have full ranges, and the test for inclusion in the range is somewhat simplified. In the above example, this yields the matrix representation:

|    | a | b | c | d | e |
|----|---|---|---|---|---|
| G: |   | 2 | 1 | 3 | 3 |
|    |   | 1 |   | 2 | 3 |

| M: | 1 |   | c |        | [d, e] |
|----|---|---|---|--------|--------|
|    | 2 |   | c | [b, c] | [d, e] |

A somewhat more complex example using this approach encodes ranges over a larger set of values (i.e., over b-k), yet the M matrix remains densely populated. In this example, the pairs of the stored data represent:

P1: (1, f), P2: (2, [f, k]), P3: (1, [d, h]) P4: (2, [b, c])

As a result of the ranges [f, k] and [d, h] overlapping, the new non-overlapping ranges are [b, c], [d, e], [f, h], and [i, k] A resulting matrix representation is as follows:

| G: | a | b | c | d | e | f | g | h | i | j | k |
|----|---|---|---|---|---|---|---|---|---|---|---|
|    |   | 4 | 4 | 2 |   | 2 | 1 | 3 | 3 | 2 | 2 | 2 |
| M: |   | 1 | 2 | 3 | 4 |
|    | 1 | f | [d, e] | [f, h] |        |
|    | 2 | f | [i, k] | [f, h] | [b, c] |

As can be seen in the matrix entry M[1][G[f]] corresponds to two stored pairs, P1: (1, f) and P3: (1, [d, h]). In use of the application of the pair lookup for chains of values, the matrix entry M[1][G[f]] is associated a edge value e(1, f) that is used to extend the chain of pairs upon receiving the f.

Therefore, in a case of static compilation of a set of pairs with range values, the steps are:
1. Identify non-overlapping ranges such that the range of any item may be composed as a union of the non-overlapping ranges
2. Expand each rule into an equivalent set of rules (e.g., P2/f and P2/[i, k]-{f})
3. Apply the matrix construction to the expanded rules with the runtime comparisons with entries of M being for inclusion in a range rather than equality.

In the case of dynamic addition of rules, it should be recognized that adding a rule may modify the set of non-overlapping ranges based on which the rules are expanded. In particular, a range may be divided into multiple sub-ranges. Therefore, when adding a rule dynamically, the sequence of steps can be summarized as:
1. Identify overlaps between the new value or range and existing non-overlapping ranges
2. Update the set of non-overlapping ranges if necessary
3. Expand the existing or new rules as necessary according to the new set of non-overlapping ranges
4. Add all newly defined rules according to the procedures described in for the single value case.

In the case of removal of rules, all expanded versions of a rule must be removed. Optionally, ranges of values may be combined, which may result in a compression of the M matrix. Alternatively, from time to time the matrix representation may be recompiled to compress. It should also be understood that the techniques described here for range-based wildcards can be combined with the clustering approach described in the section "Building Clusters" for further compression.

If in the case of dynamic insertion elements in ranges that have been extracted are not explicitly removed from the corresponding ranges the matrix may contain entire columns with empty set entries. Therefore either the dynamic removal of otherwise assigned elements of ranges or re-compilation from time to time are very helpful.

It should be recognized that this extension for lookup of index-value pairs when the stored entries are specified by ranges can be extended to lookup of sequences, rules specifying the sequences may use ranges in one or more positions in a sequence.

Server Access Use Case

Figure 9:
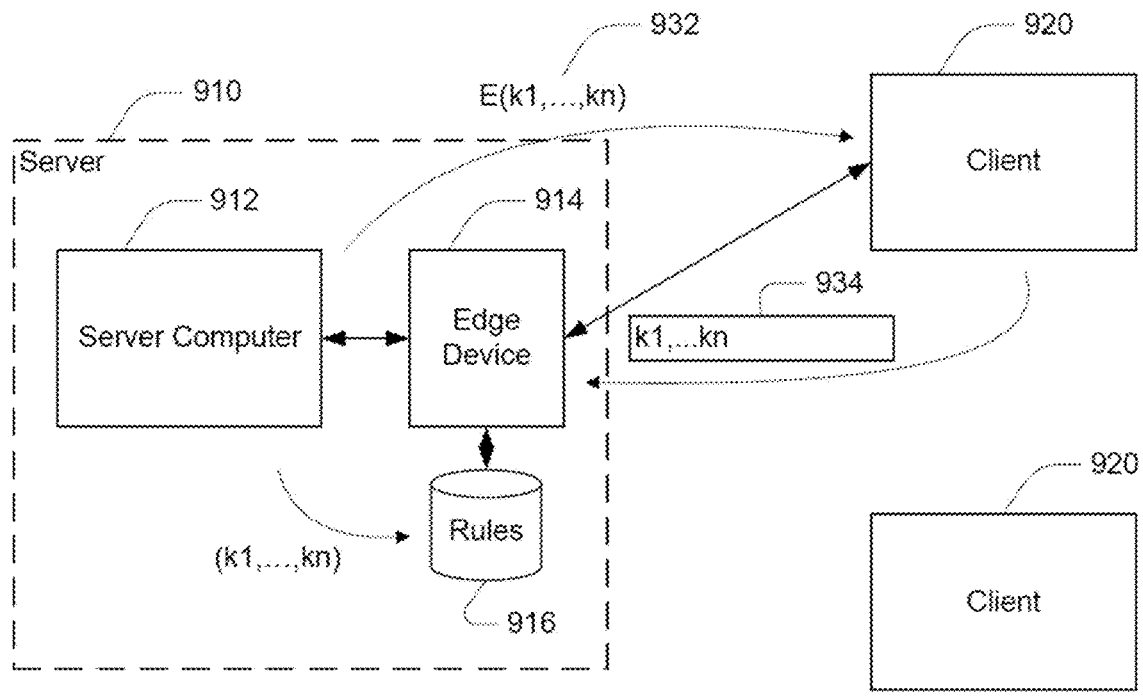
FIG. 9 is a diagram of a server access use case.

Referring to FIG. 9 a use case of capabilities described above addresses filtering inbound packets at a server 910 to only allow packets originating at a client 920 that has been suitably authorized by the server. In this use case, during an exchange between a new client 920 and the server 910, the server 910 generates a random string ($k_1, k_2, \ldots, k_N$). For example, N may be 2 or 4, and the values $k_i$ are bytes sized numbers (i.e., in a range 0 to 255). The server transmits this random string to the client 920. Generally, this transmission is encrypted, for example, being encrypted using a public key of the client or using a symmetric key that has already been shared between the client and the server (e.g., as part of an initial exchange between the client and the server). In addition to transmitting the random string to the client, the server enters the string into its BCR rule base.

Subsequently, when the client constructs a packet for transmission to the server, it puts the random string in the packet in a manner than can be accessed during initial processing of the packet at the server. For example, the random string may be inserted into a header portion of the packet, or in an initial portion of a payload of a data packet. When the server receives a packet that may have come from an authorized client, it extracts the portion of the packet that should hold a random string that was previously generated by the server and put in the BCR rule database. It then checks the database to see if the string is indeed in the database. If it is, then the packet is passed. If it is not in the database then the packet "rejected" and is not passed directly. In some embodiments in which an initial exchange between a client and a server uses the same server address, then such a rejected packet may still require processing by the server. However, such a packet may follow a different path or sequence of processing steps to ensure adequate security and resilience to malicious attack (e.g., as a Denial of Service attack). In some embodiments, packets for an ongoing session are addressed in such a manner than rejected packets can be silently dropped because the initial exchange between the server and the client uses a different path to establish the shared random string.

When a session with a client is completed, the server having saved an association of the client with the random string generated for that client removes that string from the rule database. Therefore, further packets that arrive using that random string will be rejected. In some example, the random string for a particular client may be updated by the server from time to time, and each new string is added to the rule database, and the old string is removed from the database (perhaps with a delay to accommodate as-yet unprocessed inbound packets).

In an alternative to this approach, it is an authorized client that generates the random string. What is important is that the server and the client both agree to the same random string and that the server puts that string in the rule database. Also, in yet other variants to this approach, the client and the server may agree on a sequence of random strings, for example, being seeded using a mutually agreed seed and generated in a pseudo-random manner, and from time to time the random string being used is updated. As an example of such an approach, the server may have the current string and the next string in its to database, and when the next string is first received, it removes the previous string because it will not be used again.

In yet an alternative implementation the presence of certain strings in packets (and stored in the BCR) could be used by a server to filter packets for the purpose of granting preferential access to computing resources in a network. For this purpose the same random string could also be distributed to predefined groups of users.

In the description above, the operation at the "server" should be understood as occurring at a computer system that may have an edge device, and one or more server computers. One of the server computers may generate or otherwise share the random string with a client, but the BCR rule base may be in or accessible to an edge device (e.g., a router), and the server computer instructs the edge device to add (or remove) random strings from its database or otherwise causes updates to the database accessed by the edge device. The edge device is then responsible for the initial processing of the packets. In some examples, rejected packets may be routed to one server computer, with accepted packets with a known random string may be routed to another server computer. In another variant of this approach, the server computer that mediates the sharing of the random string with the client is not accessed through the edge device. For example an authentication server may cause the random string to the shared between the edge device and the client.

Inserting Partial Strings

In some applications each element in a chain could represent an event from a given set of events at a given time to, $t_1, t_2, \ldots, t_n$. Then each time step corresponds to a new level in the data structure and a chain represents a sequence of events over time. In such a scenario there could be chains that initiate at time $t_i \neq t_0$. Such strings can be entered into the BCR as well by assigning a "free", not-connected edge at the appropriate level and connecting it to the corresponding event.

Testbed Setup

A testbed setup follows that described in D. Rovniagin and A. Wool, "The geometric efficient matching algorithm for firewalls," *Dependable and Secure Computing IEEE Transactions on*, vol. 8, no. 1, pp. 147-159, 2011, (hereinafter Rovniagin2011) with some modifications. The experimental setup consists of three computers connected via cross-over cables: a packet generating and sending machine, a router/firewall machine and a client machine. The firewall is a 3.4 GHz Intel Pentium 4 with 1024 MB of RAM, two 1 Gbps Ethernet interfaces and Debian 7.7 operating system. The packet generator has an Ubuntu 14.10 operating system.

Figure 10:
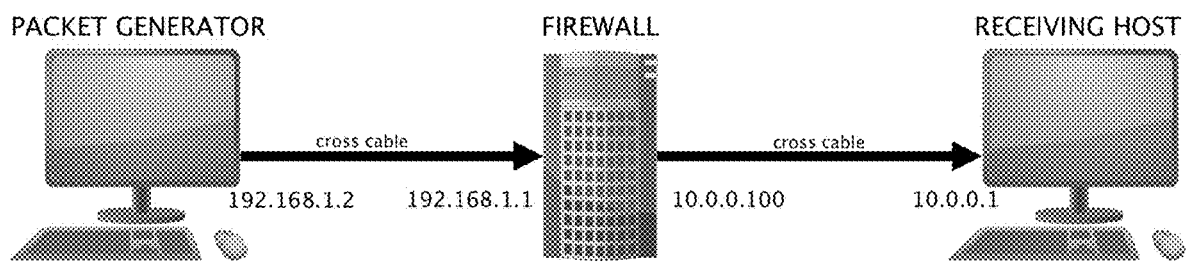
FIG. 10 is a diagram of a testbed setup.

The routing table of the firewall is configured to route all incoming packets via a second Ethernet interface (eth1) to a client machine as shown in the FIG. 10. All packets pass through the iptables FORWARD chain and—depending on the test—are either dropped at the end of the iptable chain or directed to the nf queue queue where the packet header is matched against the BCR.

Packet Generator

The packet generator is configured to send packets at fixed rates between $10^3$ and $10^5$ pps for 10 seconds. For example a sending rate of $10^5$ pps results in a constant time delay between the packets of 10 μs. Packets are constructed as follows: all packets are flag-less TCP protocol packets with a payload of 26 bytes resulting in a total packet size of 80 bytes.

Firewall Configuration

The firewall has two configurations. The first configuration is used for benchmark testing of a plain iptables implementation. With the second configuration we test the BCR in three use scenarios. Scenario 1 is closest to the one outlined in Rovniagin2011 and used to compare the iptables implementations with the one for the BCR. Scenario 2 and 3 are used to further test the behavior of the BCR for different rule sets as described in more detail below. For the purpose of this work the BCR was implemented at the application level using a nfqueue (Net Filter Queue).

iptables configuration

All incoming packets pass through iptables FORWARD chain with 1, 2,000, 4,000 or 10,000 rules. All rules are generated using the same distribution as specified in scenario 1. The packets are generated from the same ranges except for the DPort which is fixed at 65565. The last rule FORWARD -j DROP, drops all packets and the number of packets processed by this rule is counted.

BCR Configuration

All incoming packets pass through iptables FORWARD chain which contains only a single rule, forwarding all packets to nfqueue. The BCR implementation reads the relevant header information from the packets in the queue. The rule base of the firewall is optimized in size by rearranging the bytes representing SIP, SPort, DIP, and DPort for storing. Therefore the bytes read from the headers are rearranged in the same way for matching against the BCR. Finally all packets are dropped.

Testing Scenarios

Figure 11:
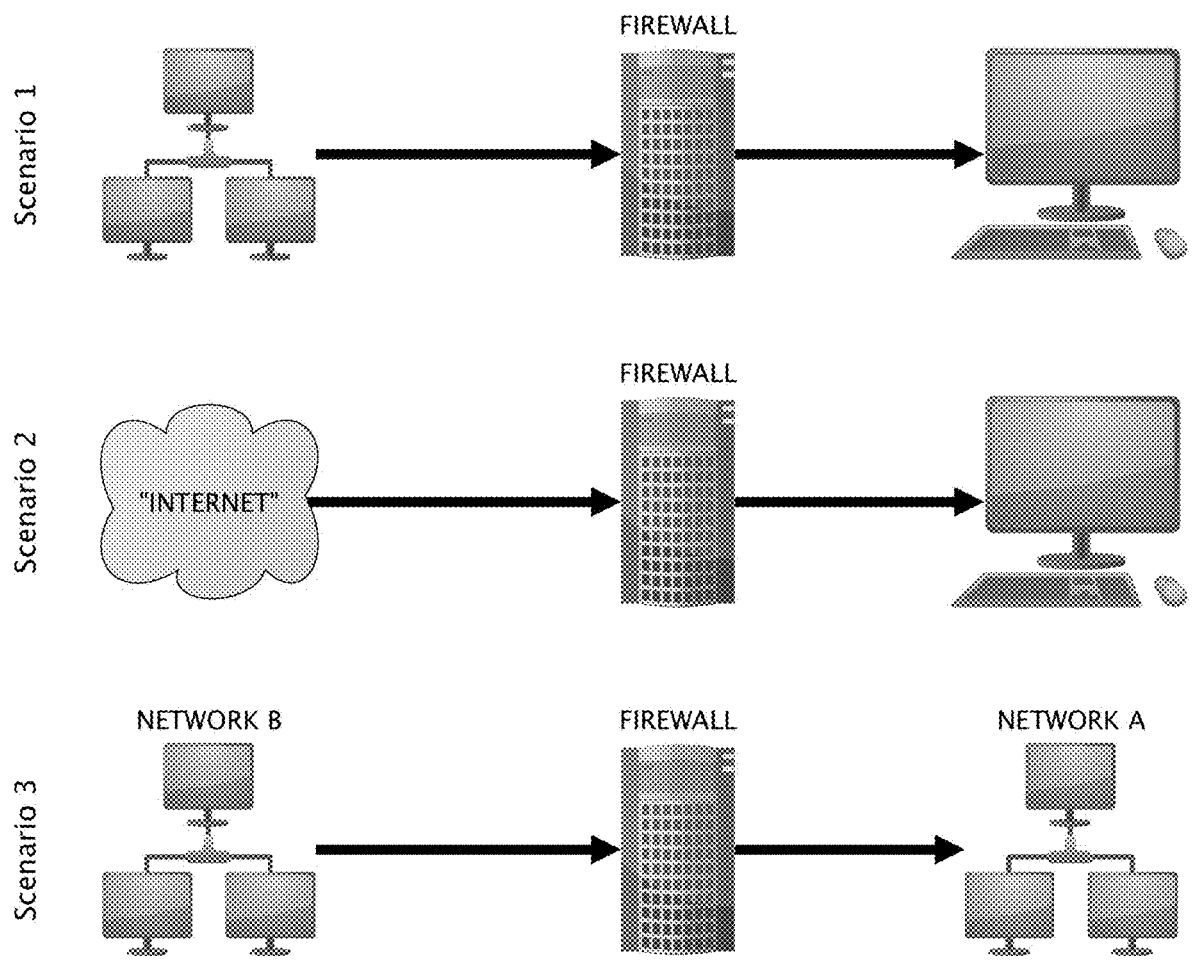
FIG. 11 is a diagram of three use case examples.

For testing we developed the use scenarios illustrated in FIG. 11. The predetermined IP ranges for the scenarios are summarized in the following table.

|      | SIP          | SPort | DIP         | DPort |
|------|--------------|-------|-------------|-------|
| S1   |              |       |             |       |
| From | 10.1.0.1     | 0     | 10.0.0.1    | 0     |
| To   | 10.10.255.254| 9     | 10.0.0.10   | 9     |
| S2   |              |       |             |       |
| From | 1.0.0.1      | 0     | 10.0.0.1    | 0     |
| To   | 223.255.255.254 | 9  | 10.0.0.10   | 9     |
| S3   |              |       |             |       |
| From | 10.1.0.1     | 0     | 10.2.0.1    | 0     |
| To   | 10.1.255.254 | 9     | 10.2.255.254| 9     |

Scenario 1 (S1) models a firewall/router between a server and clients operating within the same local network. The server has ten IP addresses (DIP) with ten open ports each (DPort). Local network users have possible IP addresses as indicated in the SIP column of table for scenario 1 (more than 6,000,000 alternatives) and may use one out of ten possible ports (DPort) to connect. The firewall rules determine which client machines are allowed to connect to the server. As mentioned above these rules are generated randomly within the indicated ranges.

The configuration in scenario 2 (S2) models a cloud server connected to the internet through a firewall where its client's possible IP addresses are from the ranges of A, B and C class IP addresses (see the table above).

With scenario 3 (S3) we model an intranet of two local networks A and B connected through a firewall. Networks A and B use different pools of ip addresses (65024 each). All allowed connections between machines in networks A and B are predetermined through rules in the firewall.

Results and Interpretation

Figure 12:
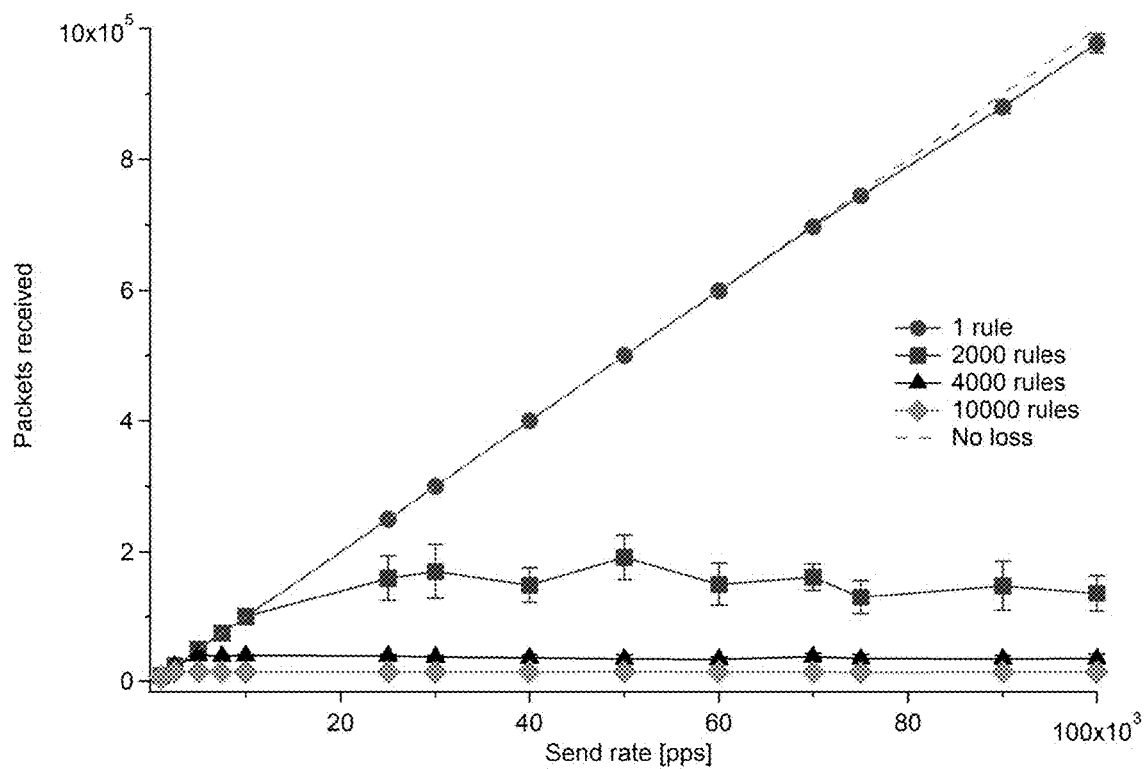
FIG. 12 is a graph of throughput without BCR.

This section reports the results of the performance tests of the BCR in the three testing scenarios. As in Rovniagin2011 first the throughput of a straightforward iptables implementation is recorded. On similar equipment for the firewall implementation and for a rules base derived from similar ranges as in Rovniagin2011 we observe comparable behavior: while for a single rule the throughput is satisfactory up to sending rates of 100,000 pps, the throughput decreases dramatically as the number of rules is increased, see FIG. 12. For 10,000 rules the throughput dropped to 1,700 pps (i.e. about 17,000 packets were received in the 10 second test).

Figure 13:
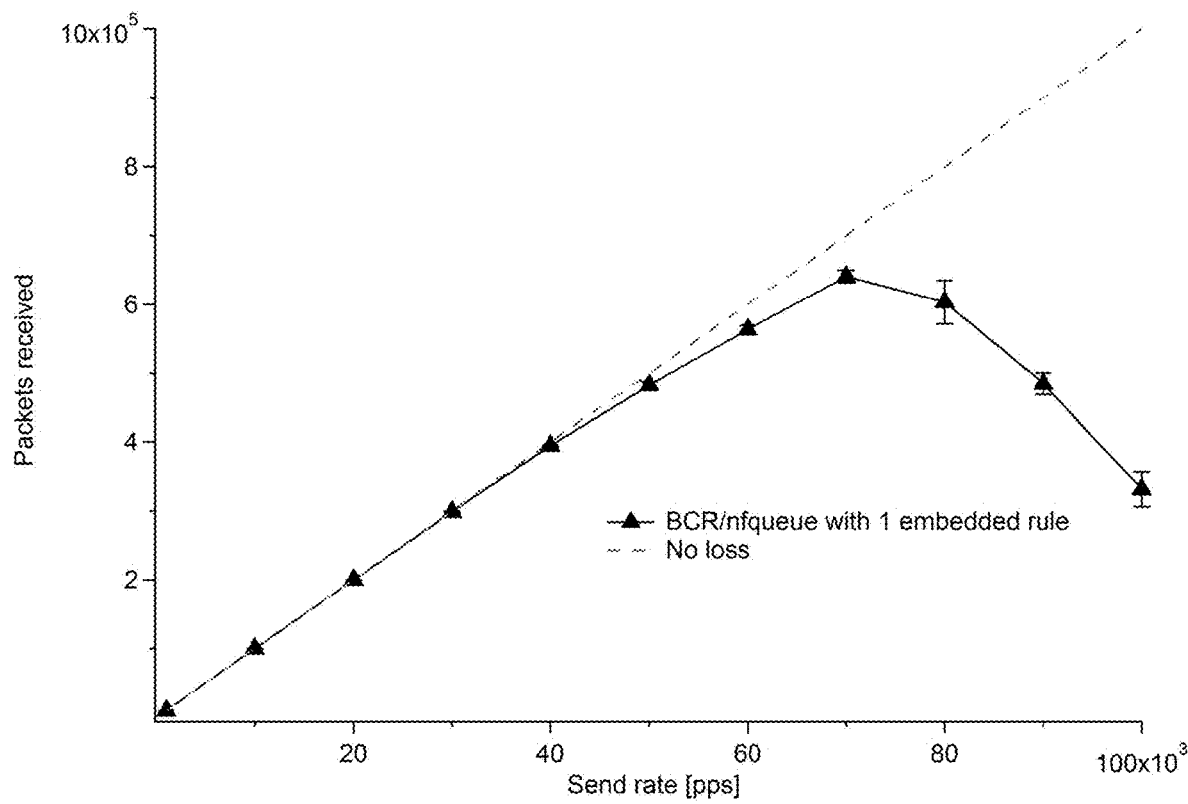
FIG. 13 is a graph of throughput with BCR.

In contrast to iptables the BCR was implemented for the testing purposes in this work at the application level using nfqueue. We therefore checked this implementation first with just one single rule embedded in the BCR to obtain a baseline performance. The results are shown in FIG. 13. We observe some packet loss at sending rates above 40,000 pps and at higher sending rates above 75,000 pps the losses become very large and the performance starts to decline significantly. For a single embedded rule the performance is significantly worse than in the kernel level iptables implementation. This is not unexpected, however, as reduced performance can be expected for high loads at the application layer. This problem can be avoided in the future by implementing the BCR at the kernel level. In the following we therefore test the BCR firewall implementation and in particular its performance for large rule bases only for sending rates up to 70,000 pps.

Figure 14:
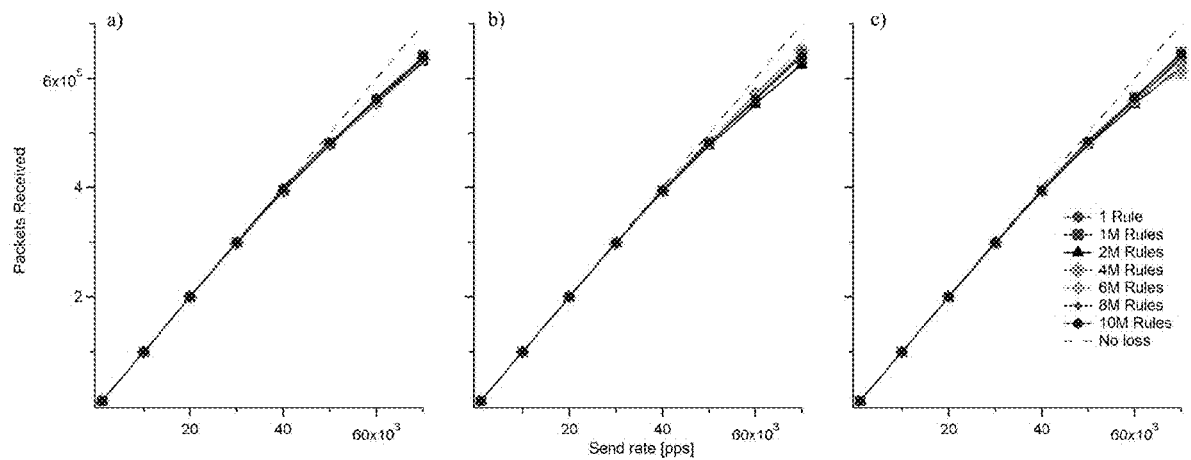
FIG. 14 is shows graphs in three test scenarios shown in FIG. 11.

We now test the BCR in the three application scenarios as a function of the number of embedded rules. FIG. 14 shows the main result of the simulations. Even for the largest rule bases and sending rates up to 70,000 pps the BCR firewall shows essentially the same performance as with one single rule in all three scenarios. Note that the simulations always tested the worst case scenario in which each packet is checked against all rules. By implementing the BCR and on similar equipment as in Rovniagin2011 (which is not high performance by today's standards) we are able to increase the number of implemented rules by three order of magnitude at the same and higher throughputs. This demonstrates that the performance of the BCR is essentially independent of the number of rules and shows its potential for implementing and enforcing fine-grained security policies.

Space Complexity

Figure 15:
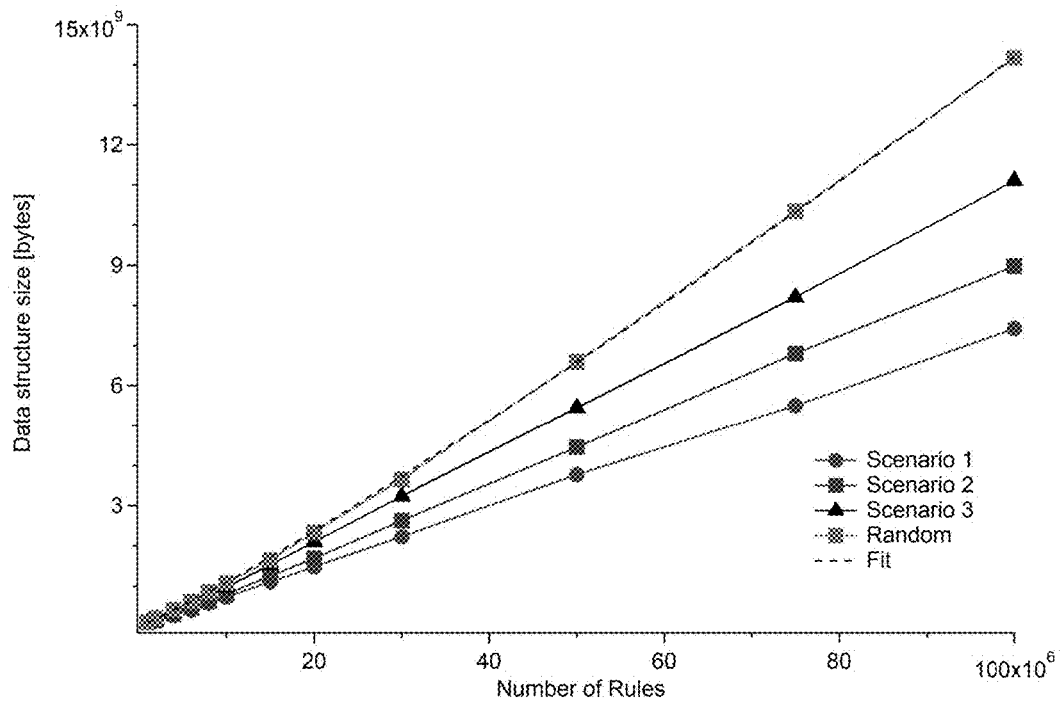
FIG. 15 is a graph of size of the BCR as a function of the number of rules.

The BCR has a space complexity $O(m \log^2 n)$, where n is the total number of nodes in a bipartite graph as shown in FIG. 4 and m the size of the edge set. In a simplified picture we can assume that the upper nodes of the bipartite graph represent the first 6 bytes of a rule and the lower nodes the last 6 bytes. Each rule would then be represented by connecting an upper node to one of the lower nodes. Therefore m=N and in the worst case n=2N. Thus the space complexity is expected to scale as $O(N \log^2 N)$. In FIG. 15 we plot the size of the data structure as a function of the number of rules in the rule base both for the three use cases as well as for completely random rules. The highest space complexity is observed for a completely random rule base. We fit this distribution $f(N)=c_1 N \log^2 N + c_2$, with good agreement, see FIG. 15. It should be pointed out that this reduction in the space complexity from $O(N^2)$ for standard approaches that enable constant time matching is critical for the scalability of this method and its applicability in real world use cases.

Search and Build Time

The search time (in the limit of large rule bases) is essentially independent from the size of the rule set and depends on the length of the chain to be matched (for this work a chain of length 12 bytes). Therefore, no optimization in the ordering of the firewall rules is required for the BCR. In the testbed discussed above we observe for sending rates up to 30 k pps search times of less than 10 μs per packet which include copying header information from the kernel to the user level. We have also tested on a 2×2.66 GHz 6-Core Intel Xeon 128 GB 1,333 MHz DDR3 ECC for random rule bases of 12 bytes; for a rule base of size N=100 million the average search times are smaller than 0.6 μs (N of N rules matched) and 0.4 μs (0 of N rules matched). The build time for this rule base (N=100 million) is an average of 6.8 μs per rule. So insertion, deletion or updating of a rule takes on the order of 10 μs.

Further Applications

Packet filtering and classification are very mature fields and highly specialized hardware and software solutions are available on the market. However, the trend towards realizing highly context dependent and dynamic access control decisions require new approaches that can manage millions of fine grained access control rules. The likelihood for firewall misconfiguration and resulting vulnerabilities has been found repeatedly to be closely related to firewall complexity. The complexity of firewall rule bases is driven by the need to implement specific security policies while limiting matching time and thus the number of rules. The most common vulnerabilities are caused by conflicting rules, inexplicit rules and performance issues. Firewall misconfiguration may lead to serious security breaches like the illegitimate execution of code, illegal changes of the state and/or unauthorized access to a resource as well as the disruption of service for legitimate users. Directly or indirectly the approach presented in this work has the potential to reduce or eliminate many of these vulnerabilities. A first step in this direction would be a kernel level implementation of the BCR.

The potential of the BCR goes well beyond firewall implementations. For example it is also well suited for longest prefix matching in packet classification. The prefixes can be stored in the BCR as concatenations of pairs of bits. The relevant header information from incoming packets can then be matched to the rules in the BCR bit by bit until the first difference occurs. If all edges with an associated longest prefix policy carry a flag one would just need to record the last flagged edge that was encountered so far and look up the associated policy.

BCR is also applicable to deep packet inspection. By storing patterns in the BCR and by parallelizing the pattern search over the BCR one should be able to take advantage of the O(1) matching time over the number of patterns.

Other broad application areas are fast access control and authentication for example based on the digital identity, roles and attributes of users in Single-Sign-On and federated identity management as well as validation and online compliance checking of distributed inter-organizational business processes.

Furthermore the BCR is applicable to implementation of novel addressing schemes in data oriented network architectures.

While a large variety of methods and algorithms like those discussed above have been developed, no constant time matching solutions have been presented which have space complexities that can be scaled to support tens to hundreds of millions of individual policies on state-of the art hardware. Due to the fast search times, the possibility of including fine grained rules and a significant reduction in the complexity of managing and maintaining the resulting rule base we believe that the approach presented here has the potential to drive significant future advances in chain matching applications.

Implementation

Implementations of the approaches described above can be in circuitry which can include dedicated memory and logic circuitry and/or general purpose instruction processors and random access memory. For examples, a group vector may be in one physical memory or a memory section and the vectors may be in another memory or memory section. In some examples, the vectors for successive parts are sequentially arranged in the memory. In some examples, the part vector contains memory address of the vectors rather than part indices so that a lookup of an pair corresponds to test (using a C-language syntax). In examples in which an instruction processor implements some or all of the procedures described above, the instructions may be stored in a tangible machine-readable medium, such as a non-volatile semiconductor or optical memory device.

In some examples, the lookup function is embodied in a discrete device (e.g., an Application Specific Integrated Circuit, ASIC), or is represented as a processing core that can be incorporated in an overall circuit design. For example, a circuit implementation of a lookup 240 can receive an index and value, and a which indicates whether a lookup, insert, or delete function is to be performed. The data structures of the chain lookup structure may be incorporated into the device, for example, with a separate memory bank for each lookup 240, or may be accessible from the device in a separate memory device.

In some implementations, a computer accessible storage medium includes a database representative of some or all of the chain data 150 and/or instructions for performing the chain lookup. Generally speaking, a computer accessible storage medium may include any non-transitory storage media accessible by a computer during use to provide instructions and/or data to the computer. For example, a computer accessible storage medium may include storage media such as magnetic or optical disks and semiconductor memories. Generally, the database representative of the system may be a database or other data structure which can be read by a program and used, directly or indirectly, to fabricate the hardware comprising the system For example, the database may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising chain lookup 140. The netlist may then be placed and routed to produce a data set describing geometric shapes to be applied to masks. The masks may then be used in various semiconductor fabrication steps to produce a semiconductor circuit or circuits corresponding to the lookup processor. In other examples, the database may itself be the netlist (with or without the synthesis library) or the data set.

In some examples, the implementations are parallel and/or pipelined. For example, in the case of the chain lookup where the graphs for each position in the sequence are separate, one parallel processor may be looking up for one sequence and another processor may be looking up for another sequence, thereby providing a pipeline speedup that improves throughput.

In some implementations, an input sequence is processed as a time series such that matches may occur at any starting position. One such time series implementation of this is to use a pipelined architecture in which at each input position, the current input token is being used at the first level, and previous tokens are concurrently being used at previous levels.

As introduced above, the circuitry implemented examples of the approach may be used and/or embedded in computing and/or networking devices, such as server computers (e.g., web server), and data networking devices such as routers, gateways, switches, etc., which may be responsible for handling data packets according to address or content where the handling involves lookups using the techniques described above.

It is to be understood that the foregoing description is intended to illustrate and not to limit the scope of the invention, which is defined by the scope of the appended claims. Other embodiments are within the scope of the following claims.

What is claimed is:

1. A method for accessing data associated with an input string using a data structure maintained in a memory device, the method comprising repeatedly performing a first procedure with successive pairs of data values, in each pair of data values a first value being determined by a prefix of the input string and a second value representing an element of the string following the prefix, wherein performing the first procedure comprises using a first segment of the data structure to access data associated with a pair of data values, the pair of data values having a first value from a first value set and a second value from a second value set, the first procedure including:
    using the second value to access a part value in a first section of a segment of the data structure, the part value identifying a second section of the segment of the data structure, said data section belonging to a second section of the segment of the data structure identified by values of the first section of the segment;
    using the first value to access a lookup value in the identified second section;
    comparing the second value and the lookup value to determine if the pair of data values is represented in the segment of the data structure; and
    using the first value to access further value in the second section, and wherein the further value is used as a first value of a data pair in a subsequent application of the first procedure in accessing the data associated with the input string.

2. The method of claim 1 wherein the lookup value represents a wildcard.

3. The method of claim 1 wherein using the first value to access a lookup value comprises using the first value to access a value in a third section of the segment of the data structure, and accessing the lookup value using the value accessed from the first section and the value accessed from the third section.

4. The method of claim 1 wherein the first procedure further comprises using the first value to access a further value in the third section, the further value being used to select the first section and the second section from a plurality of instances of said first and second sections in the first segment.

5. The method of claim 1 wherein each performing of the first procedure uses a distinct segment of the data structure.

6. The method of claim 1 further comprising:
    configuring the data structure to include a plurality of segments, each segment including:
        a first section that includes a plurality of entries, each entry being associated with a different second value, the entry storing a part value identifying a second section of a set of second sections of the segment,
        wherein each second section of the set of second section comprises a plurality of entries, each entry being associated with a different first value, the entry storing a lookup value associate with a combination of a first value and a second value,
        wherein the combination of the first value and the second value is represented in the segment if the lookup value matches the second value; and
    determining if a combination of a first value and a second value is represented in the data structure.

7. The method of claim 1 wherein the lookup value represents a set of values.

8. The method of claim 7 wherein comparing the second value and the lookup value comprises determining whether the second value belongs to the set of values.

9. The method of claim 7 wherein the lookup value represents a range of values.

10. The method of claim 1 wherein the data structure includes a plurality of arrays of storage values, wherein the first section comprises an array indexed by the second value set and each section of the set of sections comprises an array indexed by the first value set.

11. The method of claim 10 wherein each array indexed by the first value set comprises storage elements for holding values of the second value set.

12. The method of claim 1 wherein the segment of the data structure represents a bipartite graph, wherein
    the graph has a first set of nodes and a second set of node, each node of the first set of nodes is associated with a value from the first value set,
    each node of the first set of nodes is linked by an edge of a plurality of edges of the graph to at most one node of the second set of nodes,
    each node of the second set of nodes is associated with a different value from the second value set,
    each edge of the plurality of edges of the graph is associated with a different pair of the plurality of pairs of a first value and a second value, and each pair of the plurality of pairs of a first value and a second value is associated with a different edge of the plurality of edge of the graph,
    the graph has a one or more parts, each part comprising a disjoint subgraph, the data structure having a plurality of parts with each part of the data structure representing a different part of the graph, and
    the nodes of first set of nodes in any disjoint subgraph of the one or more of parts is associated 5 with different values from the first value set.

13. The method of claim 12 wherein using the first value to access the part value in the first section of a segment of the data structure comprises selecting one of the disjoint subgraphs.

14. The method of claim 13 wherein using the second value to access the lookup value comprises identifying an edge from a first node associated with the first value, and using a value associated with a second node coupled to the first node by the edge to determine the lookup value.

15. The method of claim 14 wherein comparing the second value and the lookup value comprises determining whether the second value and the value associated with second node are equal.

16. The method of claim 1 wherein the input string comprises a sequence of elements characterizing a unit of communication.

17. The method of claim 16 further comprising receiving the unit of communication.

18. The method of claim 17 further comprising processing the unit of communication according to the accessed data associated with the input string.

19. The method of claim 16 wherein the unit of communication comprises a unit of data network communication.

20. The method of claim 19 wherein the sequence of elements include an element characterizing a communication protocol.

21. The method of claim 19 wherein the sequence of elements include elements of a network address.

22. The method of claim 21 wherein the network address comprises an address of an endpoint of the data network communication.

23. The method of claim 1 further comprising maintaining the data structure:
determining whether a first (index, value) pair is represented in the data structure, including
looking up a first part number according to the index in a first memory section, looking up a stored value according the index in a second memory section selected according to the first part number, and
comparing the value with stored value and the value of the first (index, value) pair.

24. The method of claim 23 further comprising: inserting a second (index, value) pair to be represented in the data structure, including determining a second part number according to pairs currently represented in the data structure; storing the value of the second (index, value) pair according to the index of said pair in a third memory section selected according to the second part number.

25. The method of claim 23 further comprising: deleting a third (index, value) pair to be represented in the data structure, including looking up a third part number according to the index of the third (index, value) pair in a first memory section, clearing a location according the index of the third (index, value) pair in a third memory section selected according to the third part number.

26. A non-transitory machine readable medium comprising instructions for causing a processor to access data associated with an input string using a data structure maintained in a memory device, the accessing comprising performing a first procedure using a first segment of the data structure to access data associated with a pair of data values, the pair of data values having a first value from a first value set and a second value from a second value set, wherein the first procedure includes:
using the second value to access a part value in a first section of a segment of the data structure, the part value identifying a second section of the segment of the data structure, said data section belonging to a set of sections of the segment of the data structure identified by values of the first section of the segment;
using the second value to access a lookup value in the identified second section;
comparing the second value and the lookup value to determine if the pair of data values is represented in the segment of the data structure; and
using the first value to access further value in the second section, and wherein the further value is used as a first value of a data pair in a subsequent application of the first procedure in accessing the data associated with the input string.

27. The medium of claim 26 embodied in a communication processor for processing units of communication, wherein each input string comprises a sequence of elements characterizing a unit of communication.

28. An apparatus comprising:
in a memory device,
a processor configured to access data associated with an input string using a data structure maintained in the memory device, the processor being configured to repeatedly perform a first procedure with successive pairs of data values, in each pair of data values a first value being determined by a prefix of the input string and a second value representing an element of the string following the prefix, wherein performing the first procedure comprises using a first segment of the data structure to access data associated with a pair of data values, the pair of data values having a first value from a first value set and a second value from a second value set, the first procedure including:
using the second value to access a part value in a first section of a segment of the data structure, the part value identifying a second section of the segment of the data structure, said data section belonging to a second section of the segment of the data structure identified by values of the first section of the segment;
using the first value to access a lookup value in the identified second section;
comparing the second value and the lookup value to determine if the pair of data values is represented in the segment of the data structure; and
using the first value to access further value in the second section, and wherein the further value is used as a first value of a data pair in a subsequent application of the first procedure in accessing the data associated with the input string.

* * * * *